US007551242B2

(12) United States Patent
Aoyama

(10) Patent No.: US 7,551,242 B2
(45) Date of Patent: Jun. 23, 2009

(54) SINTERED ELECTRODE FOR COLD CATHODE TUBE, COLD CATHODE TUBE COMPRISING THIS SINTERED ELECTRODE FOR COLD CATHODE TUBE, AND LIQUID CRYSTAL DISPLAY DEVICE

(75) Inventor: Hitoshi Aoyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 243 days.

(21) Appl. No.: 10/570,495

(22) PCT Filed: May 2, 2005

(86) PCT No.: PCT/JP2005/008306

§ 371 (c)(1),
(2), (4) Date: Mar. 3, 2006

(87) PCT Pub. No.: WO2005/109469

PCT Pub. Date: Nov. 17, 2005

(65) Prior Publication Data

US 2008/0192176 A1 Aug. 14, 2008

(30) Foreign Application Priority Data

May 10, 2004 (JP) ............................. 2004-139559

(51) Int. Cl.
*H05B 37/02* (2006.01)
*G02F 1/13357* (2006.01)

(52) U.S. Cl. ........................................ 349/65; 428/586

(58) Field of Classification Search ....................... None
See application file for complete search history.

(56) References Cited

U.S. PATENT DOCUMENTS 6,632,116 B2 * 10/2003 Watanabe et al. ............. 445/24

FOREIGN PATENT DOCUMENTS

JP 04-255661 9/1992
JP 07-226185 8/1995
JP 2001-176445 6/2001
JP 2001-332212 11/2001
JP 2003-187740 7/2003

* cited by examiner

*Primary Examiner*—Tina M Wong
(74) *Attorney, Agent, or Firm*—Finnegan, Henderson, Farabow, Garrett & Dunner, L.L.P.

(57) ABSTRACT

There are provided (1) a sintered electrode for a cold cathode tube, comprising a cylindrical side wall part, a bottom part provided at one end of the side wall part, and an opening provided at another end of the side wall part, characterized in that the surface roughness (Sm) of the inner surface of the electrode is not more than 100 μm, (2) a cold cathode tube characterized by comprising: a hollow tubular light transparent bulb into which a discharge medium has been sealed; a fluorescent material layer provided on the inner wall surface of the tubular light transparent bulb; and a pair of the above sintered electrodes for a cold cathode tube provided respectively on both ends of the tubular light transparent bulb, and (3) a liquid crystal display device characterized by comprising: the above cold cathode tube; a light guide body disposed closely to the cold cathode tube; a reflector disposed on one surface side of the light guide body; and a liquid crystal display panel disposed on another surface side of the light guide body.

According to the present invention, a cold cathode tube, which is low in operating voltage, can significantly suppress mercury consumption and has a prolonged service life, can be provided at low cost.

15 Claims, 10 Drawing Sheets

SINTERED ELECTRODE FOR COLD CATHODE TUBE, COLD CATHODE TUBE COMPRISING THIS SINTERED ELECTRODE FOR COLD CATHODE TUBE, AND LIQUID CRYSTAL DISPLAY DEVICE

TECHNICAL FIELD

This invention provides a sintered electrode for a cold cathode tube, a cold cathode tube comprising this sintered electrode for a cold cathode tube, and a liquid crystal display device.

BACKGROUND ART

Sintered electrodes for cold cathode tubes and cold cathode tubes provided with this electrode have hitherto been used, for example, as backlights for liquid crystal display devices. In addition to high luminance and high efficiency, a long service life is required of such cold cathode tubes for liquid crystal applications.

In general, the construction of cold cathode tubes useful as backlights for liquid crystal applications is such that very small amounts of mercury and rare gas are filled into a glass tube comprising a fluorescent substance coated onto the inner surface thereof, and an electrode and a lead-in wire (for example, KOV+dumet wire) are mounted on both ends of this glass tube. In such cold cathode tubes, upon the application of voltage to both end electrodes, mercury sealed in the glass tube is evaporated, resulting in emission of ultraviolet light which is absorbed by the fluorescent substance to emit light.

Nickel materials have hitherto been mainly used as the electrode. This Ni (nickel) electrode, however, is disadvantageous in that a cathode drop voltage necessary for electron emission from the electrode to a discharge space is relatively high and, in addition, the occurrence of the phenomenon of the so-called “sputtering” is likely to deteriorate the service life of the lamp. The sputtering phenomenon refers to a phenomenon that the electrode undergoes ion collision during lighting of the cold cathode tube to cause scattering of an electrode material, and the scattered material and mercury and the like are accumulated on the internal wall surface within the glass tube.

Mercury is introduced into the sputtering layer formed by the sputtering phenomenon, making it impossible to utilize mercury in luminescence. Accordingly, when the cold cathode tube is lighted for a long period of time, the luminance of the lamp is extremely lowered to reach the end stage of the service life. Therefore, if the sputtering phenomenon could be reduced, the mercury consumption could be suppressed and, thus, the service life could be prolonged even in the same mercury sealing amount.

This has led to an attempt to simultaneously realize both cathode voltage drop reduction and sputtering suppression. In a recent effort, an electrode design, in which an electrode in a closed-end cylindrical form is adopted to attain a holocathode effect for realizing both cathode voltage drop reduction and sputtering suppression, has been proposed (Japanese Patent Laid-Open No. 176445/2001). Further, a proposal has been made in which, instead of nickel in the prior art technique, Mo (molybdenum) or Nb (niobium) or the like, which can lower the cathode voltage drop by about 20V, has been used as the electrode material.

Patent document 1: Japanese Patent Laid-Open No. 176445/2001

DISCLOSURE OF THE INVENTION

Problems to be Solved by the Invention

As compared with the conventional nickel electrode, the above closed-end cylindrical cold cathode electrodes are advantageous in terms of cathode voltage drop and service life.

Since, however, for all the closed-end cylindrical cold cathode electrodes, the closed-end cylindrical form is produced by drawing from plate materials (thickness: generally about 0.07 mm to 0.2 mm), the yield of the material is low and, in addition, for metals having poor drawability, disadvantageously, cracking and the like are likely to occur during working. Further, drawing of plate materials disadvantageously incurs high cost.

In the closed-end cylindrical electrode, the sputtering-derived consumption of the bottom part is likely to be more significant than the consumption of the side wall part. In the drawing, however, the control of the thickness or form of the bottom part and the side wall part is so difficult that the production of an electrode having a bottom part and a side wall part each having the optimal thickness and form is difficult. As a result, in some cases, the thickness is insufficient in some part and is excessive in other part. When the bottom part and the side wall part is excessively thick, disadvantageously, the surface area of the electrode is insufficient or the size of the electrode per se is large.

Thus, in order to provide a high-luminance, high-efficiency and long-service life cold cathode tube, there is a demand for a cold cathode tube electrode that can easily be mass produced at low cost while enjoying a high level of properties required as the electrode.

In general, a lead wire is welded to the bottom part of the closed-end cylindrical electrode. In the case of the conventional electrode produced by drawing of a plate material, disadvantageously, the closed-end part disappears or is deformed at the time of welding of the lead wire, or the level of lowering in weld strength caused by recrystallization is so high that it is difficult to provide a cylindrical electrode to which a lead wire has been welded with satisfactory strength.

Means for Solving the Problems

The present invention has been made with a view to solving the above problems of the prior art, and an object of the present invention is to provide a cold cathode tube electrode, which has properties favorably comparable with those of the electrode produced by drawing of the plate material, has high weld strength in the welding of a lead wire, and can be produced with good mass productivity at low cost, and to provide a cold cathode tube and a liquid crystal display device.

According to the present invention, there is provided a sintered electrode for a cold cathode tube, comprising a cylindrical side wall part, a bottom part provided at one end of the side wall part, and an opening provided at another end of the side wall part, characterized in that the surface roughness (Sm) of the inner surface of the electrode is not more than 100 μm.

In the sintered electrode for a cold cathode tube according to the present invention, preferably, said side wall part has an average thickness of not less than 0.1 mm and not more than 0.7 mm.

In the sintered electrode for a cold cathode tube according to the present invention, preferably, said bottom part has an average thickness of not less than 0.25 mm and not more than 1.5 mm.

The sintered electrode for a cold cathode tube according to the present invention is preferably formed of a metal selected from tungsten (W), niobium (Nb), thallium (Ta), titanium (Ti), molybdenum (Mo), and rhenium (Re), or its alloy.

The sintered electrode for a cold cathode tube according to the present invention preferably has a relative density of not less than 80%.

In a preferred embodiment of the present invention, the sintered electrode for a cold cathode tube comprises a sinter of a high-melting metal containing a rare earth element (R)-carbon (C)-oxygen (O) compound.

In a preferred embodiment of the present invention, the sintered electrode for a cold cathode tube has a rare earth element (R)-carbon (C)-oxygen (O) compound content of more than 0.05% by mass and not more than 20% by mass in terms of the rare earth element (R).

In a preferred embodiment of the present invention, the sintered electrode for a cold cathode tube has a carbon content of more than 1 ppm and not more than 100 ppm.

In a preferred embodiment of the present invention, the sintered electrode for a cold cathode tube has an oxygen content of more than 0.01% by mass and not more than 6% by mass.

In a preferred embodiment of the present invention, the sintered electrode for a cold cathode tube is such that the rare earth element (R)-carbon (C)-oxygen (O) compound is present as particles having an average particle diameter of not more than 10 μm in the sinter.

In the sintered electrode for a cold cathode tube according to the present invention, preferably, in a section perpendicular to the longitudinal axis direction of the sintered electrode for a cold cathode tube, the inner wall surface of the cylindrical side wall part is in a concave-convex form.

In a preferred embodiment of the present invention, the sintered electrode for a cold cathode tube is such that, in a section perpendicular to the longitudinal axis direction of the sintered electrode for a cold cathode tube, the form of the inner wall surface of the cylindrical side wall part is such that the ratio b/a, wherein a represents the outer diameter distance from an imaginary center O calculated from the outer diameter of the sintered electrode for a cold cathode tube and b represents the inner diameter maximum length, is more than 0.50 and not more than 0.95, and the ratio c/b, wherein c represents the inner diameter minimum length and b is as defined above, is more than 0.50 and not more than 0.95.

According to the present invention, there is provided a sintered electrode for a cold cathode tube, comprising a lead wire welded to the bottom part of any of the above sintered electrode for a cold cathode tube, the weld strength per unit sectional area of the lead wire being not less than 400 $N/mm^2$.

According to the present invention, there is provided a cold cathode tube characterized by comprising: a hollow tubular light transparent bulb into which a discharge medium has been sealed; a fluorescent material layer provided on the inner wall surface of the tubular light transparent bulb; and a pair of the above sintered electrodes for a cold cathode tube provided respectively on both ends of the tubular light transparent bulb.

According to the present invention, there is provided a liquid crystal display device characterized by comprising: the above cold cathode tube; a light guide body disposed closely to said cold cathode tube; a reflector disposed on one surface side of the light guide body; and a liquid crystal display panel disposed on another surface side of the light guide body.

EFFECT OF THE INVENTION

In the sintered electrode for a cold cathode tube according to the present invention, since the surface roughness (Sm) of the inner surface of the electrode is not more than 100 μm, the surface area is large and sputtering during operation can be suppressed. Therefore, the sintered electrode for a cold cathode tube according to the present invention can provide a long-service life cold cathode tube that is low in operating voltage and can significantly suppress mercury consumption.

In the sintered electrode for a cold cathode tube according to the present invention, the amount of the electrode scattered material produced by sputtering is reduced, and illuminance lowering caused by the formation of an amalgam of this scattered material and mercury, and illuminance lowering caused by mercury consumption can be effectively prevented, whereby a high-luminance, high-efficiency and long-service file cold cathode tube can be provided.

Further, for the sintered electrode for a cold cathode tube according to the present invention, the mass productivity is better than that of the conventional electrode produced by drawing from a plate material, and, thus, the sintered electrode for a cold cathode tube according to the present invention can be produced at low cost.

In particular, when the sintered electrode for a cold cathode tube according to the present invention is formed of a sinter of a high-melting metal containing a rare earth element (R)-carbon (C)-oxygen (O) compound, the cathode voltage drop can be lowered to a very low level. Therefore, the sintered electrode for a cold cathode tube according to the present invention can provide a long-service life cold cathode tube that the operating voltage is further low and the consumption of mercury is significantly suppressed. In the sintered electrode for a cold cathode tube formed of the specific rare earth compound-containing sinter, the recrystallization of a sinter structure under welding conditions has been suppressed. Therefore, in the present invention, high-voltage welding conditions, which cannot be substantially adopted in conventional electrodes produced by conventional drawing, can be adopted. A sintered electrode for a cold cathode tube having a higher lead wire weld strength than the conventional sintered electrode can easily be prepared.

When the sintered electrode for a cold cathode tube according to the present invention is such that, in a section perpendicular to the longitudinal axis direction of the sintered electrode for a cold cathode tube, the inner wall surface of the cylindrical side wall part is in a concave-convex form, the cathode voltage drop further lowered. Therefore, this sintered electrode for a cold cathode tube can provide a long-service life cold cathode tube that the operating voltage is lower and the amount of mercury consumption has been significantly suppressed.

So far as the present inventors know, neither focusing on the surface properties of the sintered electrode for a cold cathode tube nor any study on the relationship between the surface properties of the sintered electrode and the properties of the cold cathode tube has been made in the prior art. Therefore, it is surprising that a cold cathode tube having low operating voltage and significantly suppressed consumption of mercury can be provided by focusing on the surface properties of the sintered electrode, for a cold cathode tube, particularly surface properties of the inner surface of the sintered electrode for a cold cathode tube, and regulation of the surface roughness (Sm) in a specific range.

Further, it is unexpected that, in a sintered electrode for a cold cathode tube in which the surface roughness (Sm) has been regulated to a specific range, the use of a sinter of a high-melting metal containing a rare earth element (R)-carbon (C)-oxygen (O) compound can significantly lower the cathode voltage drop and, in addition, in the sintered electrode for a cold cathode tube in which the surface roughness (Sm) has been regulated to a specific range, when the inner wall surface of the cylindrical side wall part is in a concave-convex form, the cathode voltage drop is further lowered and, further, the lead wire weld strength is higher than that in the prior art.

The reduction in operating voltage can render temperature conditions and voltage conditions of the sintered electrode mild, and sputtering of the electrode can be effectively prevented. As a result, the consumption of the electrode per se and the consumption of mercury within the cold cathode tube can be significantly suppressed. At the same time, accumulation of the material scattered by sputtering on the inner wall surface of the cold cathode tube can be prevented. By virtue of the above synergistic effect, in the cold cathode tube according to the present invention, the performance deterioration by the use of the cold cathode tube is small, and the service life until the cold cathode tube is no longer usable is significantly improved. When the operating voltage of the cold cathode tube is reduced, the voltage of a display device with the cold cathode tube incorporated therein can be reduced, contributing to size reduction, weight reduction, and thickness reduction and cost reduction of the device.

The sintered electrode for a cold cathode tube, the cold cathode tube, and the liquid crystal display device according to the present invention is suitable particularly, for example, for not only battery-driven portable electronic device but also display devices which should be of power saving type and should provide stable high-quality display for a long period of time.

DESCRIPTION OF REFERENCE CHARACTERS

Figure 1:
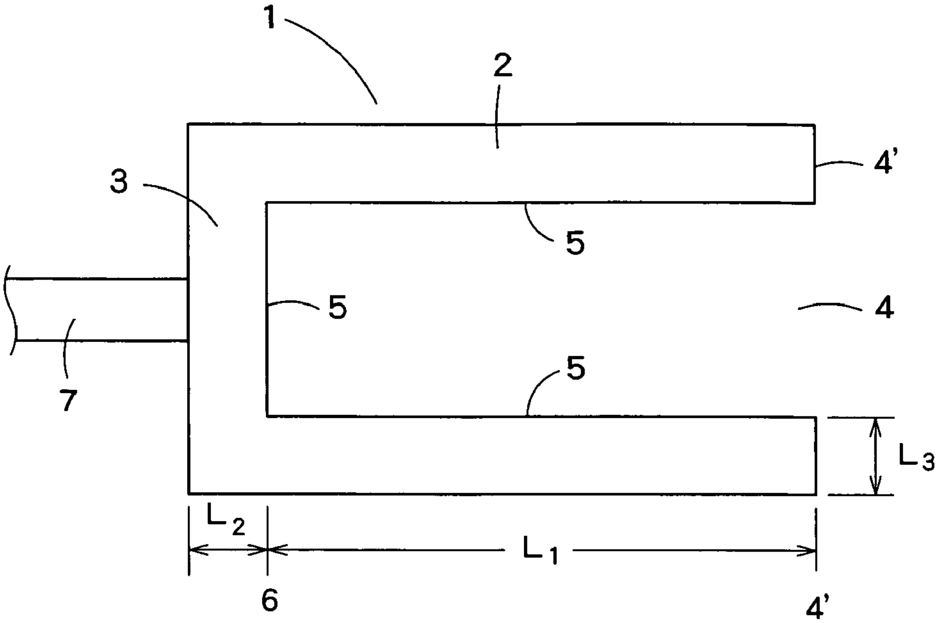
FIG. 1 is a diagram showing a section (a section parallel to the longitudinal axis direction) in a preferred embodiment of the sintered electrode for a cold cathode tube according to the present invention.

1: sintered electrode for cold cathode tube
2: side wall part
3: bottom part
4: opening
5: inner surface of electrode
6: deepest part
7: dumet wire
8: protrusion
20: liquid crystal display device
21: cold cathode tube
22: light guide body
23: reflector
24: liquid crystal display panel
25*a*, 25*b*, 25*c*: light diffuser

BEST MODE FOR CARRYING OUT THE INVENTION

<Sintered Electrode for Cold Cathode Tube (Part 1)>

As described above, the sintered electrode for a cold cathode tube according to the present invention comprises a cylindrical side wall part, a bottom part provided at one end of the side wall part, and an opening provided at another end of the side wall part, characterized in that the surface roughness (Sm) of the inner surface of the electrode is not more than 100 μm.

Figure 16:
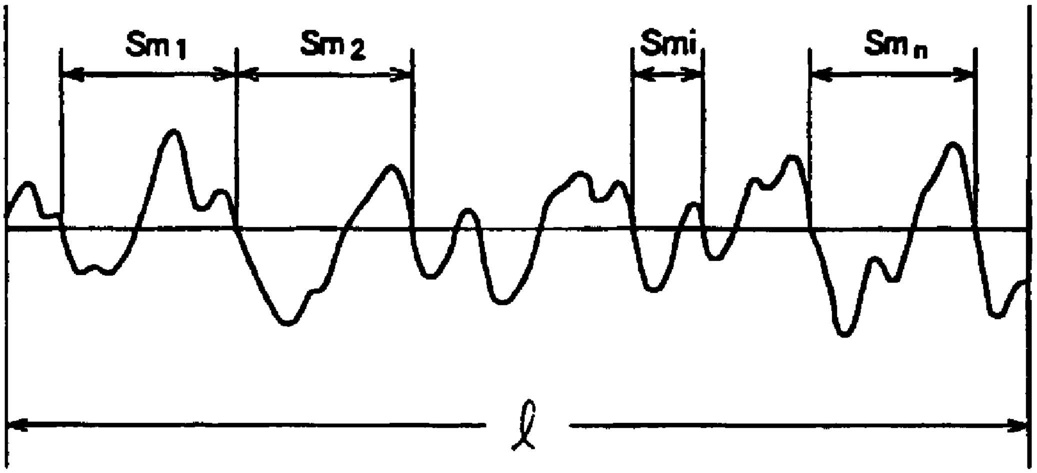
FIG. 16 is a diagram showing how surface roughness (Sm) is determined.

With reference to FIG. 16, in the present invention, "surface roughness (Sm)" is specifically one based on "average spacing of profile irregularities (Sm)" specified in JIS B 0601-1994, that is, means that "the portion equal to the reference length l is sampled from the roughness curve in the direction of its mean line, and within this sampled portion, the sum of the lengths of mean lines corresponding to one of the profile peaks and one profile valley adjacent to it is obtained and the arithmetical mean value of many spacings of these irregularities is expressed in millimeter (mm).

$$Sm = \frac{1}{n}\sum_{i=1}^{n} Smi$$ [Numerical formula 1]

FIGS. 1 and 3 to 6 are sectional views of preferred embodiments of the sintered electrode for a cold cathode tube according to the present invention. Each of these drawings shows a section parallel to the longitudinal axis direction of the sintered electrode for a cold cathode tube.

The sintered electrode (1) for a cold cathode tube according to the present invention shown in FIG. 1 comprises a cylindrical side wall part (2), a bottom part (3) provided at one end of the side wall part (2), and an opening (4) at another end of the side wall part (2), wherein the surface roughness (Sm) of the inner surface (5) of the electrode is not more than 100 μm.

As shown in FIG. 1, the term "side wall part" as used herein refers to the sintered electrode (1) for a cold cathode tube in its part present on an edge end face (4') side from the deepest part [that is, a part where the distance (L1) between the edge end face (4') in the opening (4) and the inner wall surface of the electrode is the longest] (6). The term "bottom" refers to the sintered electrode (1) for a cold cathode tube in its part which is present on the opposite side of the edge end face (4') from the deepest part (6). The inner surface (5) refers to both the inner surface of the cylindrical side wall part (2) and the inner surface of the bottom (3) in the sintered electrode (1) for a cold cathode tube.

In the present invention, one of main features is that the surface roughness of the inner surface (5) is in a predetermined Sm range. However, it should be noted that, in the present invention, each area in the inner surface (5) is not always required to have an identical Sm value. Further, in the present invention, so far as substantially the whole area (preferably not less than 30%, particularly preferably not less than 50% of the area of the inner surface (5)) of the inner surface (5) falls within the predetermined Sm range, the whole area of the inner surface (5) is not always required in a predetermined Sm range. Accordingly, in some cases, the area of a part of the inner surface (5) is not required to fall within the predetermined Sm range.

On the other hand, regarding the outer surface of the sintered electrode (1) for a cold cathode tube [that is, including, for example, the outer surface of the cylindrical side wall part (2) and the outer surface of the bottom (3) and the surface of the edge end face (4')], Sm is not specified. Specifically, Sm on the outer surface of the sintered electrode (1) for a cold cathode tube is any desired value and may be the same as or different from the above Sm range specified on the inner surface of the sintered electrode (1) for a cold cathode tube.

The term "thickness" of the bottom as used herein refers to the distance (L2) in the bottom between the above deepest part (6) and the outer surface of the bottom of the sintered electrode for a cold cathode tube. Further, the term "thickness" of the side wall part refers to the distance (L3) in the side wall part between the inner surface and the outer surface of the sintered electrode for a cold cathode tube.

Figure 2:
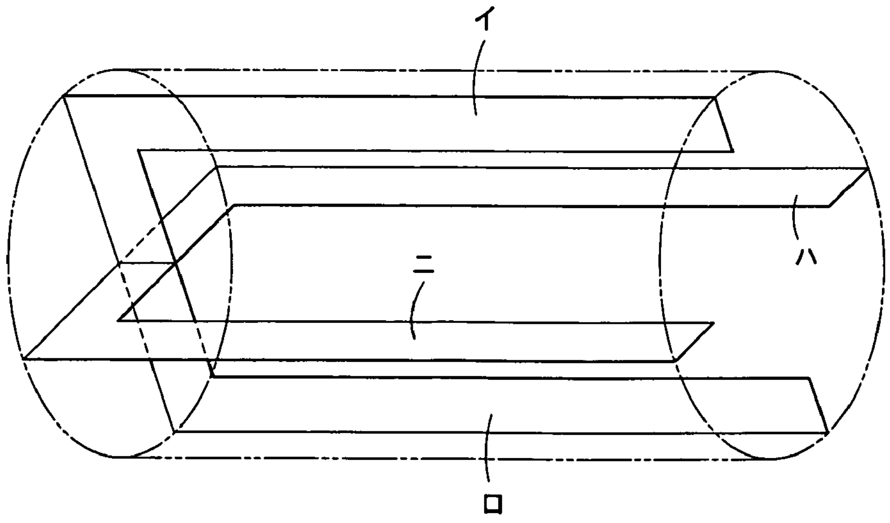
FIG. 2 is a diagram showing an acquisition position of a section used in the calculation of the side wall part average thickness and the bottom face average thickness of a sintered electrode for a cold cathode tube.

Further, for the side wall part, as shown in FIG. 2, the term "average thickness" refers to an average thickness value (unit: "mm") obtained by measuring the maximum thickness ($L_{MAX}$) and the minimum thickness ($L_{MIN}$) for each of four side wall sections [(i) to (iv)] obtained from a first section passed through the center of a cylindrical sintered electrode for a cold cathode tube [hereinafter referred to as "first section"; two side wall sections, i.e., a side wall section (i) and a side wall section (ii) in pair with the side wall section (i), are obtained from the first section] and a second section passed through the center of the cylindrical sintered electrode for a cold cathode tube and orthogonal to the first section [hereinafter referred to as "second section"; a side wall section (iii) and a side wall section (iv) in pair with the side wall section (iii) are obtained from the second section], and calculating an average thickness based on the measured data according to the following equation:

$$\text{Average thickness} = \left( \frac{(i)L_{MAX} + (i)L_{MIN}}{2} + \frac{(ii)L_{MAX} + (ii)L_{MIN}}{2} + \frac{(iii)L_{MAX} + (iii)L_{MIN}}{2} + \frac{(iv)L_{MAX} + (iv)L_{MIN}}{2} \right) \times \frac{1}{4}$$ [Numerical formula 2]

wherein "(i) $L_{MAX}$" represents "the maximum thickness ($L_{MAX}$) of "section (i)"", "(i) $L_{MIN}$" represents "the minimum thickness ($L_{MIN}$) of the section (i)"; and the same shall apply to "(ii) $L_{MAX}$", "(ii) $L_{MIN}$", "(iii) $L_{MAX}$", "(iii) $L_{MIN}$", "(iv) $L_{MAX}$", and "(iv) $L_{MIN}$".

For the bottom, the term "average thickness" as used herein refers to an average thickness value obtained by measuring the maximum thickness ($L_{MAX}$) and the minimum thickness ($L_{MIN}$) for each bottom of four sections obtained from the first section and the second section in the same manner as described above, and calculating the average value based on the measured data according to the above equation.

Figure 3:
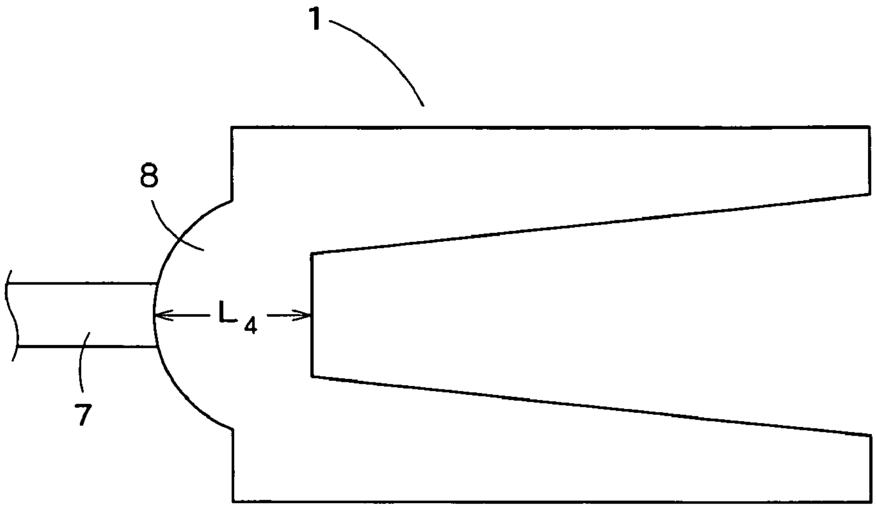
FIG. 3 is a diagram showing a section (a section parallel to the longitudinal axis direction) in a preferred embodiment of the sintered electrode for a cold cathode tube according to the present invention.

In general, a wire rod or/and a foil material formed of any one of molybdenum (Mo), W (tungsten), and KOV (kovar alloy) is joined to substantially the center part of the bottom (3) in the sintered electrode (1) for a cold cathode tube. A dumet wire or a nickel (Ni) wire (7) is further joined to the wired rod or foil material. Voltage is applied to the sintered electrode (1) for a cold cathode tube through the dumet wire (7). In some cases, as shown in FIG. 3, a protrusion part (8) may be provided at a joint between the sintered electrode (1) for a cold cathode tube and the Mo, W or KOV wire dumet wire (7). In this case, the distance (L4) between the inner surface of the bottom (3) in the sintered electrode (1) for a cold cathode tube and the joint to the Mo, W or KOV wire dumet wire (7) is regarded as the thickness of the bottom. The thickness of the bottom is increased by this protrusion part (8) and, as a result, the service life and durability of the electrode for a cold cathode tube can be improved.

As described above, in the sintered electrode for a cold cathode tube according to the present invention, the surface roughness (Sm) of the inner surface is not more than 100 μm. The reason for this is that, in a closed-end electrode, in order to lower the operating voltage, in particular, a larger electrode surface area is more advantageous, and, in particular, since discharge occurs around the inner side of the electrode, increasing the inner side surface area of the electrode is preferred. When the Sm value exceeds 100 μm, the advantageous effect on the operating voltage is poor. Further, the mercury consumption is also likely to be significantly increased, making it difficult to attain the object of the present invention, that is, to provide a long-service life cold cathode tube which has low operating voltage and significantly suppressed mercury consumption. The Sm range is preferably not less than 70 μm and not more than 90 μm, particularly preferably not less than 40 μm and not more than 50 μm.

The surface roughness (Sm) of the inner surface can be provided by setting sinter production conditions (for example, particle diameter of raw material powder) so as to provide a sintered electrode having the above inner surface, or by providing a sinter and subjecting the sinter to suitable processing (for example, polishing such as barreling or blasting, or etching) after the preparation of sinter.

The average thickness of the side face part is preferably not less than 0.1 mm and not more than 0.7 mm. This is so because, in the operation as a cold cathode tube, when the average thickness is less than 0.1 mm, problems sometimes occurs such as unsatisfactory strength or hole formation. When the average thickness exceeds 0.7 mm, the surface area on the inner side of the sintered electrode for a cold cathode tube is reduced and, consequently, the effect of reducing the operating voltage cannot be satisfactorily attained. The average thickness of the side face part is preferably not less than 0.3 mm and not more than 0.6 mm, particularly preferably not less than 0.35 mm and not more than 0.55 mm.

On the other hand, the average thickness of the bottom face part is preferably not less than 0.25 mm and not more than 1.5 mm. The reason for this is as follows. Since the inner side of the bottom face part of the electrode is significantly consumed, the thickness is preferably more than 0.25 mm. When the thickness exceeds 1.5 mm, the surface area of the inner side is reduced. In this case, as with the above case, the effect of reducing the operating voltage cannot be satisfactorily attained. The average thickness of the bottom face part is preferably not less than 0.4 mm and not more than 1.35 mm, particularly preferably not less than 0.6 mm and not more than 1.15 mm.

The sintered electrode for a cold cathode tube according to the present invention may be formed of any purposive high-melting metal. For example, the sintered electrode for a cold cathode tube may be formed of a simple substance of a metal preferably selected from tungsten (W), niobium (Nb), thallium (Ta), titanium (Ti), molybdenum (Mo), and rhenium (Re), or at least one alloy of the above metals. Mo is a preferred metal. Further examples thereof include oxides of rare earth elements such as lanthanum (La), cerium (Ce), and yttrium (Y), rare earth carboxides (particularly preferably "rare earth element (R)-carbon (C)-oxygen (O) compounds" (details thereof will be described later), and Mo to which oxides of light elements such as barium (Ba), magnesium (Mg), and calcium (Ca) have been added. Examples of preferred alloys include W—Mo alloys, Re—W alloys, and Ta—Mo alloys. Further, if necessary, a mixture of an electron emission substance with a high-melting metal may be used. Further, a very small amount (for example, not more than 1% by mass) of nickel (Ni), copper (Cu), iron (Fe), phosphorus (P) and the like may be added as a sintering aid. In general, in the production process of the cold cathode tube, since nitrogen gas is used at an elevated temperature for replacement or other purposes, as compared with the Nb-based or Ta-based metal, the Mo-based or W-based metal, which is less likely to be nitrided, is preferred. In the Mo-based and W-based metals, the Mo-based metal which can be sintered at a low temperature is more preferred than the W-based metal.

The average diameter of crystal grains of the sinter is preferably not more than 100 μm. The aspect ratio (major axis/minor axis) of the crystal grains of the sinter is preferably not more than 5.

The relative density is preferably not less than 80%, particularly preferably not less than 90% and not more than 98%. The relative density is measured by the following method.

Measurement of Relative Density

1. The bottom of the sintered electrode for a cold cathode tube is cut off by wire discharge machining or the like to obtain a sample.
2. Subsequently, the sample of the side wall part obtained in the above step 1 is halved by axisymmetrical cutting by wire discharge machining or the like. The reason why the bottom is cut is that, when the bottom is present, air bubbles enter closed spaces within the sintered electrode for a cold cathode tube and, consequently, accurate measurement is impossible.
3. Measurement is carried out for the sample obtained in the step 2 (N=5) by an Archimedes method specified in JIS Z 2501-2000, and the average is determined as a representative value.

The length of the sintered electrode for a cold cathode tube according to the present invention [that is, length between the surface of the edge end face (4') and the outer surface of the bottom farmost from the edge end face (4') (when a protrusion part is present, the surface of the front end of the protrusion part)] is mainly determined depending, for example, upon the size and performance of the cold cathode tube in which the electrode is incorporated. Preferably, however, the electrode length is not less than 3 mm and not more than 8 mm, particularly preferably not less than 4 mm and not more than 7 mm.

Likewise, the diameter of the sintered electrode for a cold cathode tube is determined depending, for example, upon the size and performance of the cold cathode tube in which the electrode is incorporated. Preferably, however, the diameter is not less than 1.0 mmϕ and not more than 3.0 mmϕ, particularly preferably not less than 1.3 mmϕ and not more than 2.7 mmϕ. The sintered electrode according to the present invention is useful in such small electrodes.

The ratio between the length and the diameter of the sintered electrode for a cold cathode tube (length/diameter) is preferably not less than 2 and not more than 3, particularly preferably not less than 2.2 and not more than 2.8.

Figure 4:
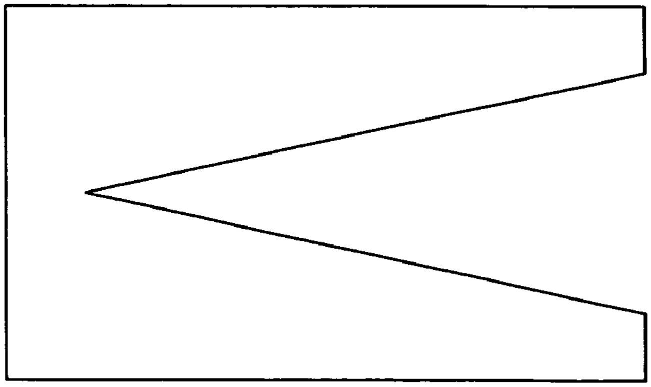
FIG. 4 is a diagram showing a section (a section parallel to the longitudinal axis direction) in a preferred embodiment of the sintered electrode for a cold cathode tube according to the present invention.
Figure 5:
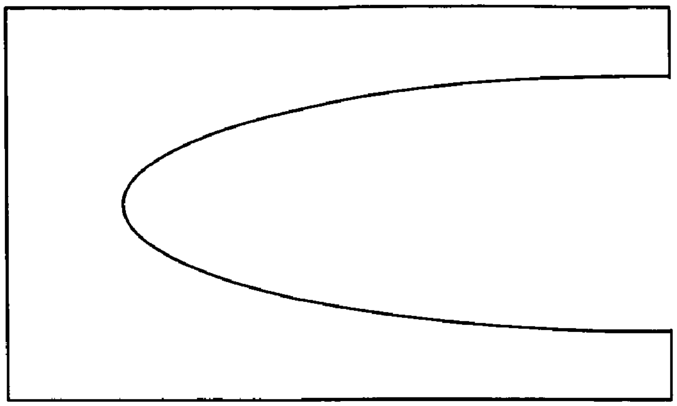
FIG. 5 is a diagram showing a section (a section parallel to the longitudinal axis direction) in a preferred embodiment of the sintered electrode for a cold cathode tube according to the present invention.
Figure 6:
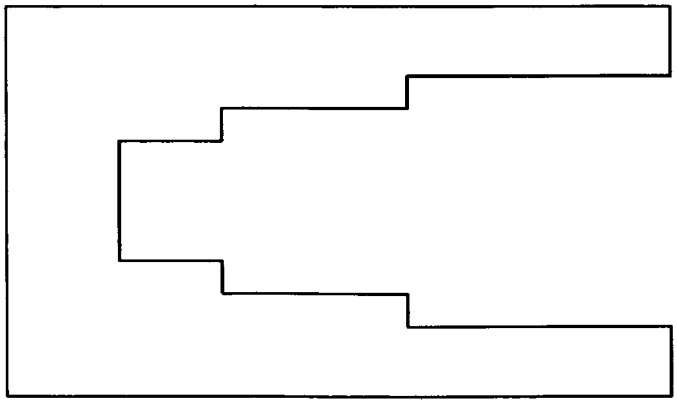
FIG. 6 is a diagram showing a section (a section parallel to the longitudinal axis direction) in a preferred embodiment of the sintered electrode for a cold cathode tube according to the present invention.

For the sintered electrode for a cold cathode tube according to the present invention, the shape of the cylindrical space in a section parallel to the longitudinal axis direction is preferably rectangular as shown in FIG. 1 or trapezoidal as shown in FIG. 3, for example, from the viewpoints of large surface area, easy production and processing, and workability of mounting on a hollow bulb in the production of the cold cathode tube. However, the shape of the cylindrical space is not limited to the above shape, and various shapes such as shown in FIG. 4 (V-shape in section), FIG. 5 (U-shape in section), and FIG. 6 (stair form in section) may be adopted. Further, for the same reason, the outer shape of the side wall part is preferably cylindrical. However, the outer shape may be other one (for example, elliptical or polygonal). The outer shape of the sintered electrode for a cold cathode tube may be different from the inner shape of the sintered electrode for a cold cathode tube.

The above construction can provide a long-service life cold cathode tube which has low operating voltage and significantly suppressed mercury consumption.

<<Production Process of Sintered Electrode for Cold Cathode Tube and Cold Cathode Tube (Part 1)>>

The sintered electrode for a cold cathode tube according to the present invention may be produced by mixing raw material powders, granulating the mixture, molding the granules into a desired shape, and then sintering the molded product.

A preferred production process of a sintered electrode for a cold cathode tube according to the present invention will be described by taking molybdenum as a representative example.

The molybdenum powder as the raw material powder has an average particle diameter of not less than 1 μm and not more than 5 μm and a purity of not less than 99.95%. This powder is mixed with pure water, a binder (preferably polyvinyl alcohol (PVA)), and the mixture is granulated. Thereafter, a cup-shaped molded product [for example, 3.0 mm in diameter×7.0 mm in length, average thickness of side face part 0.5 mm, average thickness of bottom face part 1.0 mm, bottom face protrusion R 0.6 mm (this protrusion part is not included in the length 7.0 mm)] is produced by a single action press, a rotary press, or injection molding. When injection molding is used, the protrusion part may if necessary be in a lead form.

Subsequently, degreasing is carried out in a dry hydrogen atmosphere of 800° C. to 1000° C. The degreasing time is preferably 4 hr or less. When the degreasing time exceeds 4 hr, the content of carbon in the rare earth carboxide is disadvantageously lowered. Sintering is then carried out in a hydrogen atmosphere under conditions of 1700 to 1800° C.×4 hr or longer and further is if necessary subjected to hot isostatic pressing (HIP) under conditions of 1100 to 1600° C.×100 to 250 MPa. When the surface roughness of the inner side of the closed-end shape part is not in the predetermined Sm range, or in order to bring the surface roughness to a more preferred Sm range, the surface roughness (Sm) of the inner side of the closed-end shape part may be regulated. An example of a surface roughness regulation method is barrel polishing or blasting. In this case, for example, the abrasive material used and work content may be properly selected or regulated.

Thereafter, washing is carried out, followed by annealing at a temperature of 700° C. or above and 1000° C. or below. Regarding the product to which a lead part has been attached during molding, for example, welding to a dumet rod having a size of 0.6 mm in diameter×25 mm in length is carried out. On the other hand, regarding the lead part-free product, for example, welding of a molybdenum rod having a size of 0.8 mm in diameter×2.6 mm in length and a dumet rod having a size of 0.6 mm in diameter×40 mm in length are carried out to complete assembling of the electrode. In the welding of the electrode on the bottom to the Mo rod, a foil material of Ni, KOV or the like may be inserted for welding. The construction of the lead part (diameter or length) may be any desired one.

<Sintered Electrode for Cold Cathode Tube (Part 2)>

In one preferred embodiment of the present invention, as described above, the sintered electrode for a cold cathode tube is formed of a sinter of a high-melting metal containing a rare earth element (R)-carbon (C)-oxygen (O) compound. The "rare earth element (R)-carbon (C)-oxygen (O) compound" refers to a compound containing a rare earth element (R), carbon (C), and oxygen (O) as constituents.

Rare earth elements (R) include, for example, lanthanum (La), cerium (Ce), samarium (Sm), praseodymium (Pr), and neodymium (Nd). Among them, lanthanum (La), cerium (Ce), and samarium (Sm) are particularly preferred. In the "rare earth element (R)-carbon (C)-oxygen (O) compound" may contain a plurality of rare earth elements in an identical compound. Further, in the sinter of the sintered electrode for a cold cathode tube according to the present invention may contain a plurality of types of "rare earth element (R)-carbon (C)-oxygen (O) compounds" which are different from each other in type of rare earth element, its content, or carbon and/or oxygen content.

The composition of the sinter constituting the sintered electrode for a cold cathode tube can easily be judged by color mapping using EPMA (electron probe micro analyzer). Accordingly, in the sintered electrode for a cold cathode tube according to the present invention, the presence of the above "rare earth element (R)-carbon (C)-oxygen (O) compound" in the sinter is observed as at least one of the sinter constituents other than the high-melting metal, as judged by color mapping using EPMA.

This "rare earth element (R)-carbon (C)-oxygen (O) compound" may be represented by chemical formula $R_xC_yO_z$ or $R_xO_y(CO_z)_a$ wherein R represents a rare earth element; x, y, z, and a are any number. Possible such compounds include, for example, (i) La-based compounds such as LaCO, $La_2O(CO_3)_2$, $La_2O_2CO_3$, $La_2CO_5$, $La_2O(CO_3)_2$, and $La_2O_2CO_3$, (ii) Ce-based compounds such as $CeO_2C_2$ and $Ce_4O_2C_2$, (iii) Sm-based compounds, for example, $SmO_{0.5}C_{0.4}$ and $Sm_2CO_5Sm_2O_2CO_3$, (iv) compounds having an indefinite structure, (5) mixtures or compounds comprising the above compounds (1) to (4), and (6) other compounds.

In the sintered electrode for a cold cathode tube according to the present invention, the content of the rare earth element (R)-carbon (C)-oxygen (O) compound is preferably more than 0.05% by mass and not more than 20% by mass in terms of the rare earth element (R), particularly preferably more than 0.5% by mass and not more than 10% by mass. When the content is not more than 0.05% by mass, the cathode voltage drop is disadvantageously high, while, when the content is more than 10% by mass, sintering is disadvantageously less likely to proceed. For the above reason, both the above content ranges are unfavorable.

The content of carbon in the sinter constituting the sintered electrode for a cold cathode tube according to the present invention is preferably more than 1 ppm and not more than 100 ppm, particularly preferably more than 5 ppm and not more than 70 ppm. When the carbon content is not more than 1 ppm, the cathode voltage drop is high, while, a carbon content exceeding 100 ppm is disadvantageous in that, when the sinter is used as the electrode, gas (mainly $CO_2$ gas) release has an adverse effect on discharge. For the above reason, the carbon content is preferably in the above-defined range. The carbon content can be determined by measuring infrared absorption properties of a sample in a state free from carbon contamination from environment (for example, preferably within a clean room). The amount of the sample should be not less than 5 g to enhance detection accuracy.

The content of oxygen in the sinter constituting the sintered electrode for a cold cathode tube according to the present invention is preferably more than 0.01% by mass and not more than 6% by mass, particularly preferably more than 0.1% by mass and not more than 3% by mass. When the oxygen content is not more than 0.01% by mass, disadvantageously, the rare earth metal is likely to evaporate during use. On the other hand, an oxygen content of more than 3.0% by mass is disadvantageous in that, when the sinter is used as the electrode, gas (mainly $CO_2$ gas) release has an adverse effect on discharge. For the above reason, the oxygen content is preferably in the above-defined range.

In the sinter constituting the sintered electrode for a cold cathode tube according to the present invention, the rare earth element (R)-carbon (C)-oxygen (O) compound is preferably present, in the sinter, as particles having an average particle diameter of not more than 10 μm, particularly preferably not more than 5 μm. When the average particle diameter is more than 10 μm, the diffusion of the above compound on the electrode surface is unsatisfactory and, further, the distribution quantity of the above compound on the electrode surface is reduced, resulting in increased cathode voltage drop. For this reason, the above-defined particle diameter range is preferred. Here the term "average particle diameter" is determined. by conducting measurement in three or more places of 40 μm×40 μm under an electron microscope and determining the average value of the maximum diameters of the projected particles.

In the sintered electrode for a cold cathode tube according to the present invention formed of the above sinter, the recrystallization of the sintered structure upon the application of a high voltage current has been suppressed. Accordingly, in the present invention using the specific sinter, higher-voltage welding conditions can be adopted in welding a lead wire to the electrode. Therefore, in a conventional electrode produced by conventional drawing, high-voltage welding conditions, which could not have been substantially adopted in the conventional electrode produced by conventional drawing, can be adopted in the present invention, and, thus, a sintered electrode for a cold cathode tube having a higher lead wire weld strength than the conventional cold cathode tube can easily be prepared.

In the present invention, as described above, a sintered electrode for a cold cathode tube, which can provide a long-service life cold cathode tube having low operating voltage and significantly suppressed mercury consumption and, at the same time, can realize a lead wire weld strength of not less than 400 $N/mm^2$ per unit sectional area, can easily be provided.

Figure 10:
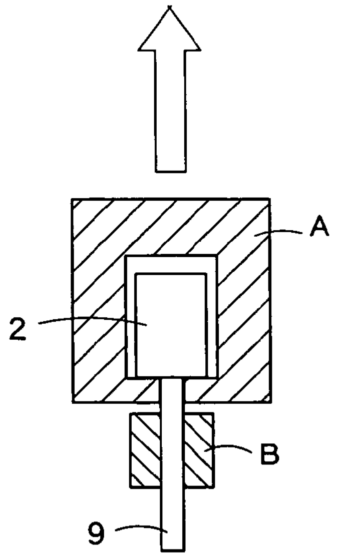
FIG. 10 is a schematic diagram showing a method for evaluation of lead wire weld strength.

As shown in FIG. 10, the weld strength per unit sectional area of the lead wire may be measured as follows. A sintered electrode 1 for a cold cathode tube having a lead wire welded to its bottom is fixed within a slit formed in a chucking A. On the other hand, a lead wire 9 is fixed with a chucking B, and the chucking A is pulled at a rate of 10 mm/min.

<Sintered Electrode for Cold Cathode Tube (Part 3)>

In one preferred embodiment of the present invention, as described above, in a section perpendicular to the longitudinal axis direction of the sintered electrode for a cold cathode tube, the inner wall surface of the cylindrical side wall part is in a concave-convex form. In this sintered electrode for a cold cathode tube according to the present invention, the inner surface area of the electrode (that is, surface area within the tube in a tubular electrode) is large, and the utilization of a hollow cathode effect derived from the tubular shape of the electrode can be maximized.

Accordingly, the sintered electrode for a cold cathode tube according to the present invention can further lower the operating voltage of the cold cathode tube.

Figure 11:
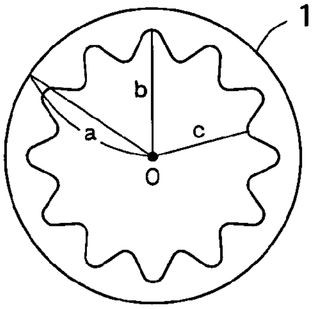
FIG. 11 is a diagram showing a section (a section perpendicular to the longitudinal axis direction) in a preferred embodiment of the sintered electrode for a cold cathode tube according to the present invention.
Figure 12:
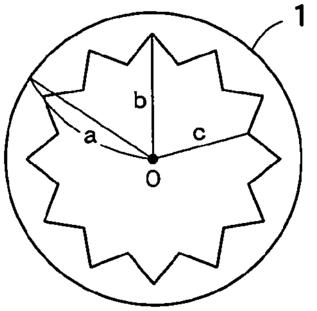
FIG. 12 is a diagram showing a section (a section perpendicular to the longitudinal axis direction) in a preferred embodiment of the sintered electrode for a cold cathode tube according to the present invention.

In a sintered electrode 1 for a cold cathode tube according to the present invention, the concave-convex shape on the inner wall surface of the cylindrical side wall part may be any one. Specific examples of preferred concave-convex shapes include, for example, a corrugated shape as shown in FIG. 11 and concave-convex shapes as shown in FIGS. 12 and. 13. Among them, the corrugated shape shown in FIG. 11 has large surface area and hollow cathode effect and is particularly excellent in easiness on production and processing and durability or the like.

Figure 13:
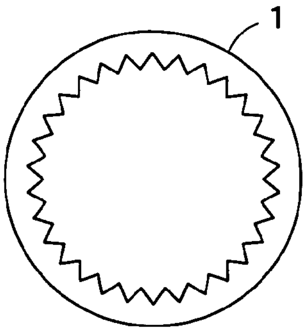
FIG. 13 is a diagram showing a section (a section perpendicular to the longitudinal axis direction) in a preferred embodiment of the sintered electrode for a cold cathode tube according to the present invention.

In preferred sintered electrodes for a cold cathode tube in the present invention (including both sintered electrodes shown in FIGS. 11 to 13 and sintered electrodes not shown in FIGS. 11 to 13), in a section perpendicular to the longitudinal axis direction of the sintered electrode for a cold cathode tube, the form of the inner wall surface of the cylindrical side wall part is such that the ratio b/a, wherein a represents the outer diameter distance from an imaginary center O calculated from the outer diameter of the sintered electrode for a cold cathode tube and b represents the inner diameter maximum length, is more than 0.50 and not more than 0.95, and the ratio c/b, wherein c represents the inner diameter minimum length and b is as defined above, is more than 0.50 and not more than 0.95.

The imaginary center (○) is a value determined with a roundness measuring device by "minimum area method" specified in JIS B 7451. The "outer diameter distance a" refers to an average distance between the imaginary center (○) and a plurality of points (preferably 8 points or more) present on the outer surface of the cylindrical side wall part in a section (the same section) perpendicular to the longitudinal axis direction of the sintered electrode for a cold cathode tube. The "inner diameter maximum length b" refers to a distance between the above imaginary center (○) and the farthermost point present on the inner surface of the side wall part in the same section. The "inner diameter minimum length c" refers to a distance between the imaginary center (○) and the nearmost point present on the inner surface of the side wall part in the same section.

When the ratio between the inner diameter maximum length b and the outer diameter distance a, i.e., b/a, is not more than 0.50, it is difficult to ensure a satisfactory surface area on the inner wall surface of the electrode. Further, in this case, the mold used in the production of the electrode is likely to be broken. On the other hand, when the b/a ratio exceeds 0.95, in the production of the electrode, cracking is likely to occur in the electrode and, consequently, the reject rate is enhanced. When the ratio between the inner diameter maximum length b and the outer diameter distance a, i.e., c/b, is not more than 0.50, cracking is likely to occur in the electrode during the production of the electrode. On the other hand, when the c/b ratio exceeds 0.95, the effect of improving the surface area of the internal wall surface is reduced. For the above reason, the b/a range and the c/b range are preferably in the above-defined respective ranges.

The concave-convex shape of the inner wall surface of the electrode is such that identical or similar concaves and/or convexes are regularly arranged, or concaves and convexes which are quite different from each other in size and shape are irregularly present. Further, in the whole section of a part extending from the opening to bottom in the cylindrical electrode, concaves and convexes having a substantially identical shape are provided on the inner wall part, or alternatively concaves and convexes may be changed in a some portion between the opening and the bottom, or further alternatively concave-convex shape-free parts may be present. In this case, the inner diameter maximum length b and the inner diameter minimum length c, b/a, and c/b, vary depending upon the cylindrical electrode part (that is, sectional position).

When the convenience in the production of the electrode, stability in use as the electrode, durability and the like are taken into consideration, the concave-convex shape of the inner wall surface in the electrode is preferably such that work for taking out the resultant sinter from the mold is easy and, further, the strength is even over the whole area without a local lack of strength. Accordingly, the concave-convex shape of the inner wall surface of the electrode is particularly preferably such that, in a section perpendicular to the longitudinal axis direction of the electrode, the concave and convex are relatively gently continued and, in a section parallel to the longitudinal axis direction of the electrode, the same concave-convex shape is continuously formed. An example of this is shown in FIG. 11 in which the corrugated shape is continuously formed on the inner wall surface extended from the opening to the bottom in the cylindrical electrode without a significant change in inner diameter maximum length b, inner diameter minimum length c, b/a, and c/b among parts of the cylindrical electrode (that is, sectional positions).

The sintered electrode for a cold cathode tube in which the inner wall surface of the cylindrical side wall part has the above shape may be produced by any desired method. In the present invention, in the production of the sinter, a method using a mold constructed so as to form a cylindrical sinter having the above inner wall surface shape is preferably adopted. In the present invention, after the production of the sinter, for example, barrelling, washing, and annealing are carried out to fabricate the inner side of the cylindrical side wall part into the above shape.

<<Production Process of Sintered Electrode for Cold Cathode Tube, and Cold Cathode Tube (Part 2)>>

The sintered electrode for a cold cathode tube according to the present invention in which the inner wall surface has the above predetermined shape may be produced by mixing raw material powders together, granulating the mixture, molding the granules into a predetermined shape and then sintering the molded product.

A preferred production process of the sintered electrode for a cold cathode tube according to the present invention will be described by mainly taking molybdenum as an example.

The molybdenum powder as the raw material powder has an average particle diameter of not less than 1 μm and not more than 5 μm, a purity of not less than 99.95%, and an oxygen content of not more than 0.5% by mass. When the raw material powder has a high oxygen content, the oxygen content after sintering is also large. For this reason, the above-defined content range is preferred. The rare earth metal (usually oxide) has an average particle diameter of not less than 0.1 μm and not more than 2 μm. Pure water and a binder (the binder being preferably polyvinyl alcohol (PVA)) are mixed in the powder, followed by granulation.

Next, a molded product is produced from the granules by a single press, a rotary press, or injection molding using a mold suitable for the formation of an inner wall surface having a predetermined shape. Thereafter, degreasing treatment is carried out in dry hydrogen at a temperature of 800° C. or above and 1000° C. or below for 4 hr or less. In this case, when degreasing is carried out for more than 4 hr, the carbon content is sometimes excessively lowered. Subsequently, sintering is carried out in hydrogen at a temperature of 1700° C. or above and 1800° C. or below for not less than 4 hr. If necessary, barreling, washing and annealing are carried out to prepare a sinter (for example, 1 to 3 mm in diameter×3 to 6 mm in length) having predetermined concaves and convexes in its inner wall surface.

Subsequently, a molybdenum rod having a diameter of 0.8 mm and a length of 2.6 mm is welded to a dumet rod having a diameter of 0.6 mm and a length of 40 mm to complete the assembly of the electrode. For example, a kovar alloy and nickel may be used as an insert metal for the electrode and the molybdenum rod.

<Cold Cathode Tube>

The cold cathode tube according to the present invention is characterized by comprising: a hollow tubular light transparent bulb into which a discharge medium has been sealed; a fluorescent material layer provided on the inner wall surface of the tubular light transparent bulb; and a pair of the above sintered electrodes for a cold cathode tube provided respectively on both ends of the tubular light transparent bulb.

In the cold cathode tube according to the present invention, for example, a discharge medium, a tubular light transparent bulb, and a fluorescent material layer, which are indispensable constituent elements other than the sintered electrode for a cold cathode tube, those which have hitherto been used in this type of cold cathode tubes, particularly cold cathode tubes for backlight in liquid crystal displays, may be used either as such or after suitable alteration.

Regarding elements which can be applied and are preferred in the cold cathode tube according to the present invention, examples of discharge media include rare gas-mercury systems (examples of rare gases including argon, neon, xenon, krypton, and mixtures thereof), and examples of fluorescent materials include fluorescent materials which emit light upon ultraviolet light stimulation, preferably calcium halophosphate fluorescent materials.

Examples of hollow tubular light transparent bulbs include glass tubes having a length of not less than 60 mm and not more than 700 mm and a diameter of not less than 1.6 mm and not more than 4.8 mm.

<Liquid Crystal Display Device>

The liquid crystal display device according to the present invention is characterized by comprising: the above sintered electrode for a cold cathode tube; a light guide body disposed closely to the sintered electrode for a cold cathode tube; a reflector disposed on one surface side of the light guide body; and a liquid crystal display panel disposed on another surface side of the light guide body.

Figure 9:
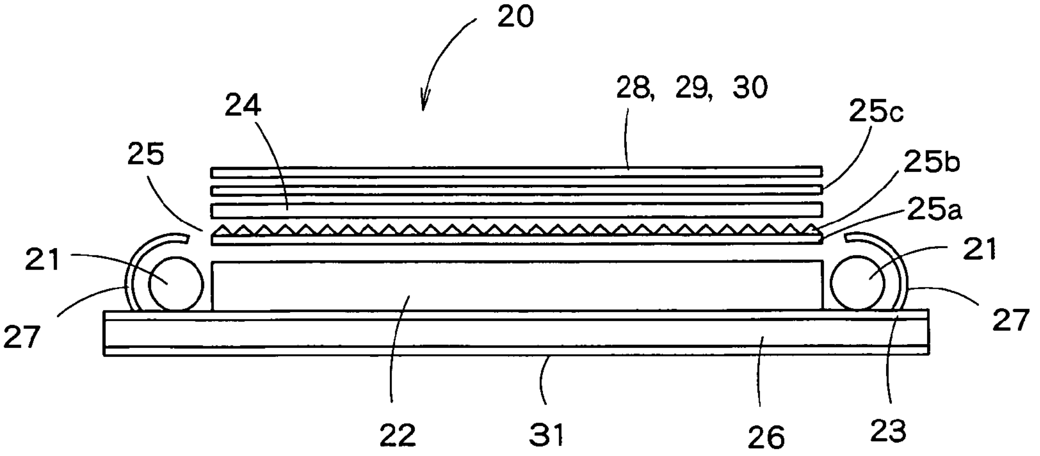
FIG. 9 is a cross-sectional view of a preferred embodiment of the liquid crystal display device according to the present invention.

FIG. 9 is a cross-sectional view of a particularly preferred embodiment of the liquid crystal display device according to the present invention.

A liquid crystal display device 20 shown in FIG. 9 comprises a cold cathode tube 21, a light guide body 22 disposed closely to the cold cathode tube 21, a reflector 23 disposed on one surface side of the light guide body 22; and a liquid crystal display panel 24 disposed on another surface side of the light guide body 22. Further, a light diffuser 25 is disposed between the light guide body 22 and the liquid crystal display panel 24. A reflector 27 for a cold cathode tube which reflects light from the cold cathode tube 21 toward the light guide body 22 side is provided.

In the present invention, the number of cold cathode tubes may be any desired one. For example, as shown in FIG. 9, two (total) cold cathode tubes 21 may be disposed closely to two opposed sides of the light guide body 22. One or at least two cold cathode tubes may be disposed closely to one side (or three or more sides) of the light guide body. The number and shape of the light diffuser 25 may also be any desired ones. For example, at least one sheet light diffuser 25*a* to which light diffusing properties have been imparted by allowing light diffusing particles to exist within the diffuser, and at least one lens or prism light diffuser 25*b* to which light diffusing properties have been imparted by regulating the surface shape may be disposed between the light guide body 22 and the liquid crystal display panel 24. If necessary, for example, a light diffuser 25*c*, a surface protector 28, an antireflector 29 for preventing or reducing external light reflection or external light catching, and an antistatic body 30 may be provided on the viewer side of the liquid crystal display panel 24. Two or more of these light diffusers 25*a*, 25*b*, 25*c*, surface protector 28, antireflector 29, antistatic body 30 and the like may be composited to provide one or at least two layers which simultaneously have a plurality of functions. For example, the light diffusers 25*a*, 25*b*, 25*c*, and the surface protector 28, antireflector 29, and antistatic body 30 may not be provided when desired functions as the liquid crystal display device can be exhibited without these constituent elements. Further, a support substrate 26, a frame, and a spacer for holding individual constituent members of the liquid crystal display device 20 (that is, the cold cathode tube 21, the light guide body 22, the reflector 23, the liquid crystal display panel 24, the light diffusers 25*a*, 25*b*, 25*c*, the surface protector 28, the antireflector 29, and the antistatic body 30 and the like) in respective predetermined positions, and a case for housing these constituent members may be provided. Further, a heat radiating member 31 and the like may also be provided. In the liquid crystal display device according to the present invention, as with the conventional liquid crystal display device, for example, electric wiring and LSI chip for supplying drive voltage to the liquid crystal display panel 24, electric wiring for supplying drive voltage to the cold cathode tube 21, and a seal material for preventing leakage of light toward unnecessary parts and the entry of dust or moisture into the device may be provided at the respective necessary sites.

In the present invention, the cold cathode tube 21 should satisfy predetermined requirements which have been described above in detail. However, various constituent members (for example, the light guide body 22, the light reflector 23, the liquid crystal display panel 24, the light diffuser 25*a*, 25*b*, 25*c*, the support substrate 26, the reflector 27 for a cold cathode tube, the surface protector 28, the antireflector 29, the antistatic body 30, the heat radiating member 31, the frame, the case, and the seal member) other than the cold cathode tube 21 may be those which have hitherto been used in the art.

EXAMPLES

Examples 1 to 53 and Comparative Examples 1 to 33

Electrodes were prepared under varied conditions as shown in Tables 1 to 4 and were incorporated in a cold cathode tube for the evaluation of properties.

The cold cathode tube had an outer diameter of 3.2 mm and an interelectrode distance of 350 mm, and a mixed gas composed of mercury and neon/argon was sealed into the tube. Regarding initial properties, the results of measurement of the operating voltage are shown in Tables 1 to 4.

Regarding the service life of the cold cathode tube, "rare gas discharge mode" in which mercury within the tube is consumed as a result of the formation of an amalgam with the sputtering material is dominative. Therefore, the service life of the cold cathode tube was evaluated by evaluating the amount of mercury consumed.

The results of measurement of the amount of mercury consumed after 15000 hr are also shown in Tables 1 to 4.

When the Sm value exceeds 100 μm, the operating voltage and the amount of mercury evaporated are rapidly increased. When the Sm value is not more than 100 μm, this phenomenon disappears.

In the case of Mo with $La_2O_3$ added thereto, the operating voltage is considerably lowered.

Very good properties are provided when the thickness of the side wall part and the thickness of the bottom face part are 0.4 mm and 0.5 mm, respectively.

Figure 7:
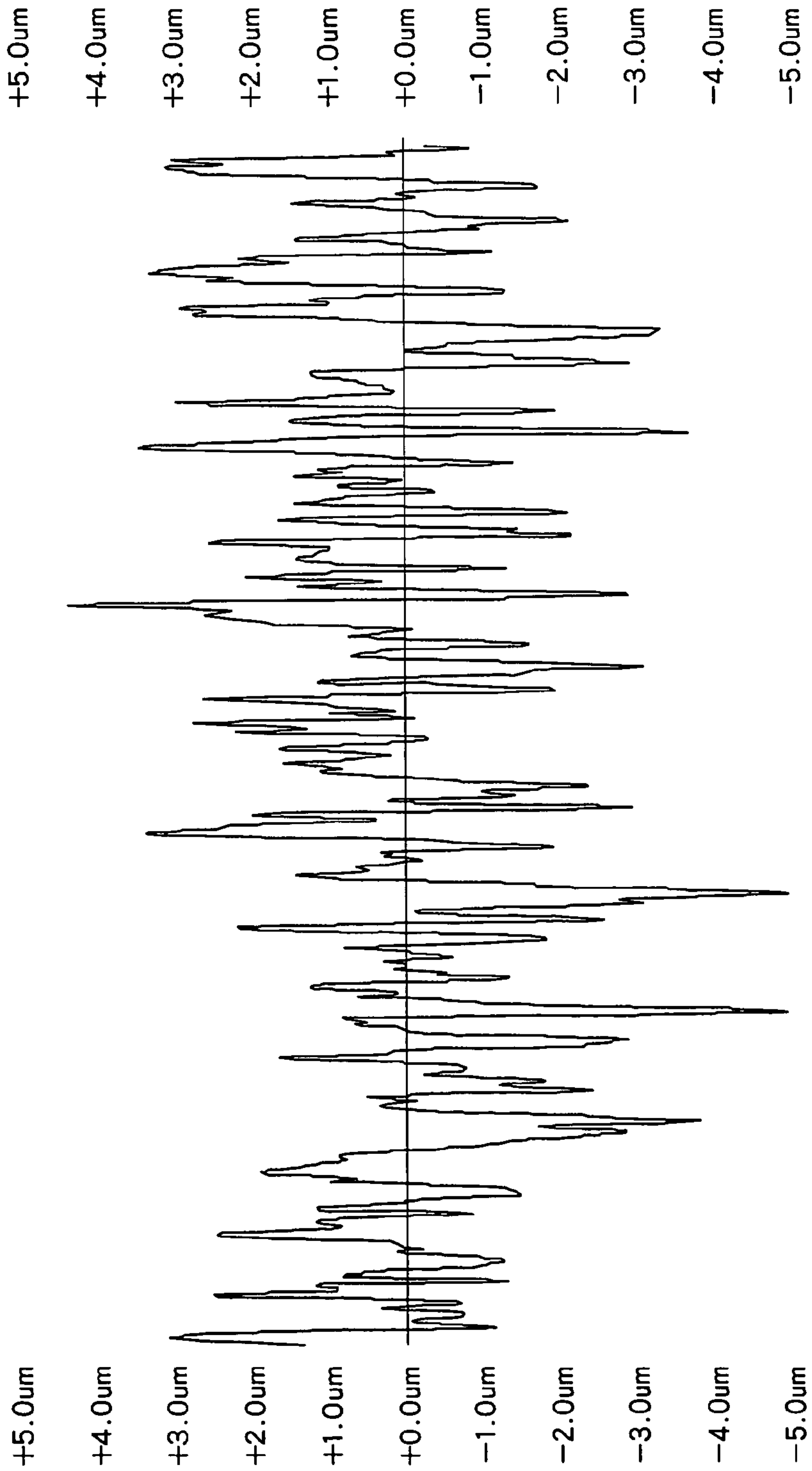
FIG. 7 is a diagram showing the results of measurement of the surface roughness (Sm) of the inner surface of the sintered electrode for a cold cathode tube in Example 1.
Figure 8:
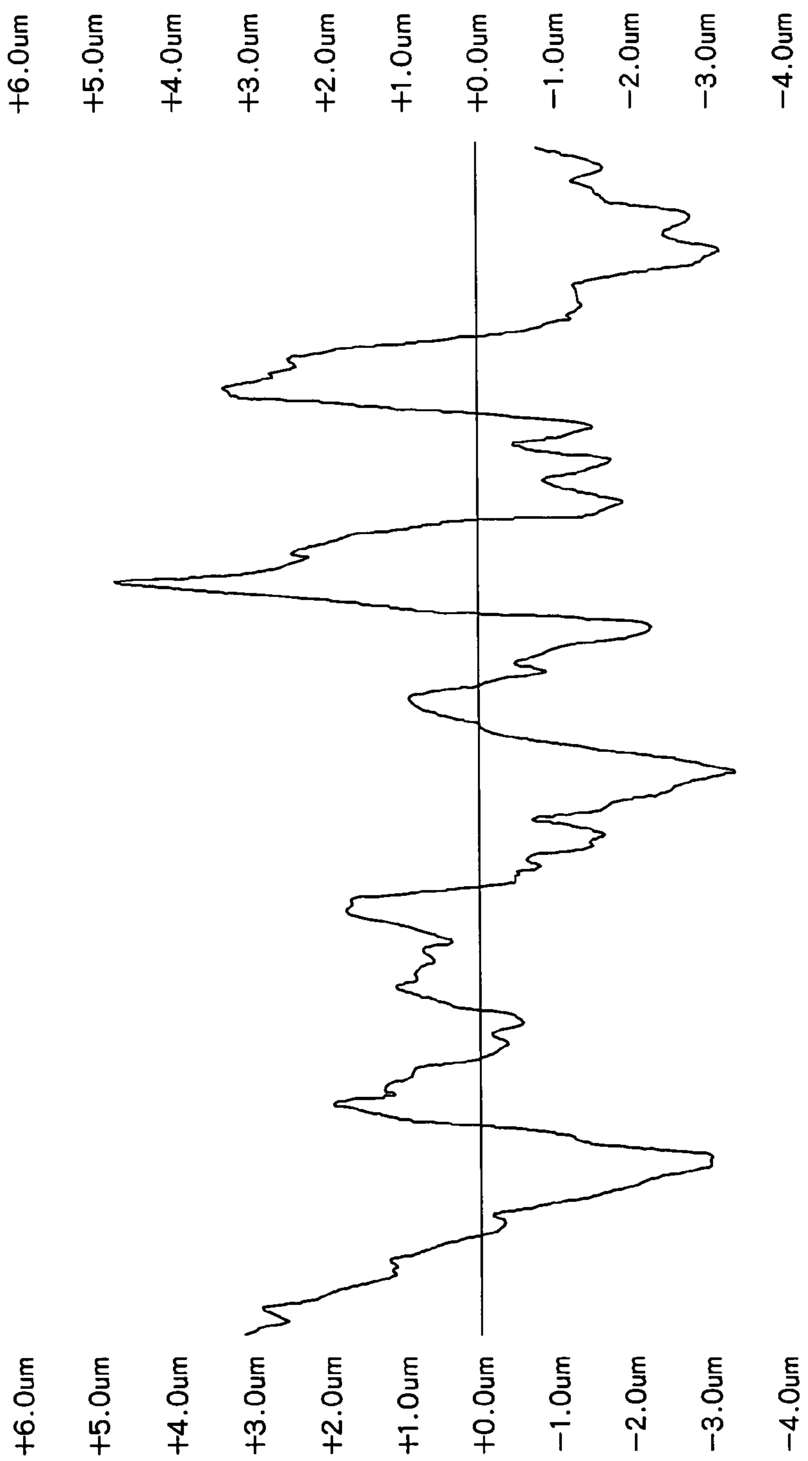
FIG. 8 is a diagram showing the results of measurement of the surface roughness (Sm) of the inner surface of the sintered electrode for a cold cathode tube in Comparative Example 6.

The results of measurement of the surface roughness (Sm) of the inner surface of the sintered electrode for a cold cathode tube in Example 1 are shown in FIG. 7, and the results of measurement of the surface roughness (Sm) of the inner surface of the sintered electrode for a cold cathode tube in Comparative Example 6 are shown in FIG. 8.

Measuring instrument: S4 manufactured by Taylor Hobson

Measuring conditions: cutoff=0.8 mm, evaluation length=1.6 mm, filter=Gaussian filter, stylus tip=R 2 μm, stylus shape=60° cone.

TABLE 1

| Example No. | Composition of sinter | Inner surface roughness, Sm, μm | Side face average thickness, mm | Bottom average thickness, mm | Relative density, % | Protrusions and shape of protrusions, if any | Operating voltage, V | Amount of evaporated mercury (after 15,000 hr), mg |
|---|---|---|---|---|---|---|---|---|
| Example 1 | Mo | 38 | 0.45 | 0.85 | 95 | None | 545 | 0.30 |
| Example 2 | Mo | 70 | 0.45 | 0.85 | 95 | None | 555 | 0.34 |
| Example 3 | Mo | 90 | 0.45 | 0.85 | 95 | None | 563 | 0.36 |
| Example 4 | Mo | 100 | 0.45 | 0.85 | 95 | None | 570 | 0.40 |
| Comparative Example 1 | Mo | 110 | 0.45 | 0.85 | 95 | None | 574 | 0.47 |
| Comparative Example 2 | Mo | 120 | 0.45 | 0.85 | 95 | None | 574 | 0.47 |
| Comparative Example 3 | Mo | 130 | 0.45 | 0.85 | 95 | None | 575 | 0.48 |
| Comparative Example 4 | Mo | 140 | 0.45 | 0.85 | 95 | None | 575 | 0.48 |
| Comparative Example 5 | Mo | 150 | 0.45 | 0.85 | 95 | None | 575 | 0.48 |
| Comparative Example 6 | Mo | 237 | 0.45 | 0.85 | 95 | None | 580 | 0.50 |
| Example 5 | 2% $La_2O_3$—Mo | 40 | 0.45 | 0.85 | 95 | None | 530 | 0.25 |
| Example 6 | 2% $La_2O_3$—Mo | 70 | 0.45 | 0.85 | 95 | None | 545 | 0.29 |
| Example 7 | 2% $La_2O_3$—Mo | 90 | 0.45 | 0.85 | 95 | None | 550 | 0.31 |
| Example 8 | 2% $La_2O_3$—Mo | 100 | 0.45 | 0.85 | 95 | None | 560 | 0.35 |
| Example 9 | 2% $La_2O_3$—Mo | 110 | 0.45 | 0.85 | 95 | None | 563 | 0.42 |
| Comparative Example 7 | 2% $La_2O_3$—Mo | 120 | 0.45 | 0.85 | 95 | None | 564 | 0.43 |
| Comparative Example 8 | 2% $La_2O_3$—Mo | 130 | 0.45 | 0.85 | 95 | None | 565 | 0.43 |
| Comparative Example 9 | 2% $La_2O_3$—Mo | 140 | 0.45 | 0.85 | 95 | None | 565 | 0.43 |
| Comparative Example 10 | 2% $La_2O_3$—Mo | 150 | 0.45 | 0.85 | 95 | None | 565 | 0.43 |
| Comparative Example 11 | 2% $La_2O_3$—Mo | 200 | 0.45 | 0.85 | 95 | None | 570 | 0.45 |

TABLE 2

| Example No. | Composition of sinter | Inner surface roughness, Sm, μm | Side face average thickness, mm | Bottom average thickness, mm | Relative density, % | Protrusions and shape of protrusions, if any | Operating voltage, V | Amount of evaporated mercury (after 15,000 hr), mg |
|---|---|---|---|---|---|---|---|---|
| Example 9 | Nb | 40 | 0.45 | 0.85 | 95 | None | 545 | 0.30 |
| Example 10 | Nb | 70 | 0.45 | 0.85 | 95 | None | 555 | 0.34 |
| Example 11 | Nb | 90 | 0.45 | 0.85 | 95 | None | 563 | 0.36 |
| Example 12 | Nb | 100 | 0.45 | 0.85 | 95 | None | 570 | 0.40 |
| Comparative Example 13 | Nb | 110 | 0.45 | 0.85 | 95 | None | 574 | 0.47 |
| Comparative Example 14 | Nb | 120 | 0.45 | 0.85 | 95 | None | 574 | 0.47 |
| Comparative Example 15 | Nb | 130 | 0.45 | 0.85 | 95 | None | 575 | 0.48 |
| Example 13 | Ta | 40 | 0.45 | 0.85 | 95 | None | 545 | 0.30 |
| Example 14 | Ta | 70 | 0.45 | 0.85 | 95 | None | 555 | 0.34 |
| Example 15 | Ta | 90 | 0.45 | 0.85 | 95 | None | 563 | 0.36 |
| Example 16 | Ta | 100 | 0.45 | 0.85 | 95 | None | 570 | 0.40 |
| Comparative Example 16 | Ta | 110 | 0.45 | 0.85 | 95 | None | 574 | 0.47 |
| Comparative Example 17 | Ta | 120 | 0.45 | 0.85 | 95 | None | 574 | 0.47 |
| Comparative Example 18 | Ta | 130 | 0.45 | 0.85 | 95 | None | 575 | 0.48 |
| Example 17 | Ti | 40 | 0.45 | 0.85 | 95 | None | 545 | 0.30 |
| Example 18 | Ti | 70 | 0.45 | 0.85 | 95 | None | 555 | 0.34 |
| Example 19 | Ti | 90 | 0.45 | 0.85 | 95 | None | 563 | 0.36 |
| Example 20 | Ti | 100 | 0.45 | 0.85 | 95 | None | 570 | 0.40 |
| Comparative Example 19 | Ti | 110 | 0.45 | 0.85 | 95 | None | 574 | 0.47 |
| Comparative Example 20 | Ti | 120 | 0.45 | 0.85 | 95 | None | 574 | 0.47 |
| Comparative Example 21 | Ti | 130 | 0.45 | 0.85 | 95 | None | 575 | 0.48 |

TABLE 3

| Example No. | Composition of sinter | Inner surface roughness, Sm, μm | Side face average thickness, mm | Bottom average thickness, mm | Relative density, % | Protrusions and shape of protrusions, if any | Operating voltage, V | Amount of evaporated mercury (after 15,000 hr), mg |
|---|---|---|---|---|---|---|---|---|
| Example 21 | W | 40 | 0.45 | 0.85 | 95 | None | 545 | 0.30 |
| Example 22 | W | 70 | 0.45 | 0.85 | 95 | None | 555 | 0.34 |
| Example 23 | W | 90 | 0.45 | 0.85 | 95 | None | 563 | 0.36 |
| Example 24 | W | 100 | 0.45 | 0.85 | 95 | None | 570 | 0.40 |
| Comparative Example 22 | W | 110 | 0.45 | 0.85 | 95 | None | 574 | 0.47 |
| Comparative Example 23 | W | 120 | 0.45 | 0.85 | 95 | None | 574 | 0.47 |
| Comparative Example 24 | W | 130 | 0.45 | 0.85 | 95 | None | 575 | 0.48 |
| Example 25 | 10% Re—Mo | 40 | 0.45 | 0.85 | 95 | None | 545 | 0.30 |
| Example 26 | 10% Re—Mo | 70 | 0.45 | 0.85 | 95 | None | 555 | 0.34 |
| Example 27 | 10% Re—Mo | 90 | 0.45 | 0.85 | 95 | None | 563 | 0.36 |
| Example 28 | 10% Re—Mo | 100 | 0.45 | 0.85 | 95 | None | 570 | 0.40 |
| Comparative Example 25 | 10% Re—Mo | 110 | 0.45 | 0.85 | 95 | None | 574 | 0.47 |
| Comparative Example 26 | 10% Re—Mo | 120 | 0.45 | 0.85 | 95 | None | 574 | 0.47 |
| Comparative Example 27 | 10% Re—Mo | 130 | 0.45 | 0.85 | 95 | None | 575 | 0.48 |

TABLE 4

| Example No. | Composition of sinter | Inner surface roughness, Sm, μm | Side face average thickness, mm | Bottom average thickness, mm | Relative density, % | Protrusions and shape of protrusions, if any | Operating voltage, V | Amount of evaporated mercury (after 15,000 hr), mg |
|---|---|---|---|---|---|---|---|---|
| Comparative Example 28 | Mo | 200 | 0.1 | 0.2 | 95 | None | 620 | 0.68 |
| Comparative Example 29 | Mo | 200 | 0.15 | 0.2 | 95 | None | 600 | 0.64 |
| Example 29 | Mo | 90 | 0.2 | 0.25 | 95 | None | 566 | 0.38 |

TABLE 4-continued

| Example No. | Composition of sinter | Inner surface roughness, Sm, μm | Side face average thickness, mm | Bottom average thickness, mm | Relative density, % | Protrusions and shape of protrusions, if any | Operating voltage, V | Amount of evaporated mercury (after 15,000 hr), mg |
|---|---|---|---|---|---|---|---|---|
| Example 30 | Mo | 90 | 0.3 | 0.35 | 95 | None | 564 | 0.36 |
| Example 31 | Mo | 90 | 0.5 | 0.5 | 95 | None | 560 | 0.35 |
| Example 32 | Mo | 90 | 0.7 | 0.75 | 95 | None | 564 | 0.36 |
| Example 33 | Mo | 90 | 0.8 | 0.75 | 95 | None | 580 | 0.50 |
| Example 34 | Mo | 90 | 1.0 | 0.75 | 95 | None | 600 | 0.60 |
| Example 35 | Mo | 90 | 0.5 | 1.0 | 95 | None | 563 | 0.36 |
| Example 36 | Mo | 90 | 0.5 | 1.3 | 95 | None | 562 | 0.35 |
| Example 37 | Mo | 90 | 0.5 | 1.5 | 95 | None | 560 | 0.35 |
| Example 38 | Mo | 90 | 0.5 | 1.7 | 95 | None | 580 | 0.50 |
| Example 39 | Mo | 90 | 0.5 | 1.0 | 95 | Protrusion with R0.6 | 555 | 0.34 |
| Example 40 | Mo | 90 | 0.5 | 1.0 | 95 | Lead shape of 0.8 × 2.8 mm | 555 | 0.34 |
| Example 41 | Nb | 42 | 0.5 | 1.0 | 75 | None | 570 | 0.44 |
| Example 42 | Nb | 41 | 0.5 | 1.0 | 80 | None | 560 | 0.34 |
| Example 43 | Nb | 42 | 0.5 | 1.0 | 90 | None | 550 | 0.31 |
| Example 44 | Nb | 40 | 0.5 | 1.0 | 95 | None | 544 | 0.29 |
| Example 45 | Nb | 39 | 0.5 | 1.0 | 98 | None | 540 | 0.27 |
| Example 46 | Nb | 40 | 0.5 | 1.0 | 100 | None | 540 | 0.27 |
| Example 47 | 2% $La_2O_3$—Mo | 39 | 0.45 | 0.85 | 95 | None | 530 | 0.25 |
| Example 48 | 2% $La_2O_3$—Mo | 43 | 0.4 | 0.5 | 98 | None | 500 | 0.18 |
| Example 49 | 2% $La_2O_3$—Mo | 41 | 0.4 | 0.5 | 100 | None | 500 | 0.18 |
| Comparative Example 30 | 50% Mo—W | 188 | 0.15 | 0.2 | 95 | None | 600 | 0.59 |
| Example 50 | 50% Mo—W | 75 | 0.2 | 0.25 | 95 | None | 566 | 0.38 |
| Comparative Example 31 | 50% Ta—Mo | 234 | 0.15 | 0.2 | 95 | None | 600 | 0.62 |
| Example 51 | 50% Ta—Mo | 94 | 0.2 | 0.25 | 95 | None | 566 | 0.35 |
| Comparative Example 32 | 26% Re—W | 199 | 0.15 | 0.2 | 95 | None | 600 | 0.66 |
| Example 52 | 26% Re—W | 88 | 0.2 | 0.25 | 95 | None | 566 | 0.35 |
| Comparative Example 33 | 2% Ni-3% Cu—W | 203 | 0.15 | 0.2 | 95 | None | 600 | 0.63 |
| Example 53 | 2% Ni-3% Cu—W | 92 | 0.2 | 0.25 | 95 | None | 566 | 0.38 |

Examples 54 to 110 and Comparative Examples 34 and 35

Electrodes were prepared under varied conditions as shown in Tables 5 to 7 and were incorporated in a cold cathode tube for the evaluation of properties.

For all the sintered electrodes for a cold cathode tube prepared in the Examples and Comparative Examples, the shape was as shown in FIG. 1, and the surface roughness (Sm) of the inner surface of the electrode was not more than 100 μm.

The cold cathode tubes had an outer diameter of 2.0 mm and an interelectrode distance of 350 mm, and a mixed gas composed of mercury and neon/argon was sealed into the tube. Regarding the service life of the cold cathode tube, "rare gas discharge mode" in which mercury within the tube is consumed as a result of the formation of an amalgam with the sputtering material is dominative. Therefore, the service life can be evaluated by evaluating the amount of mercury consumed.

The results of measurement of the amount of mercury consumed after 10000 hr are also shown in Tables 5 to 7.

Figure 14:
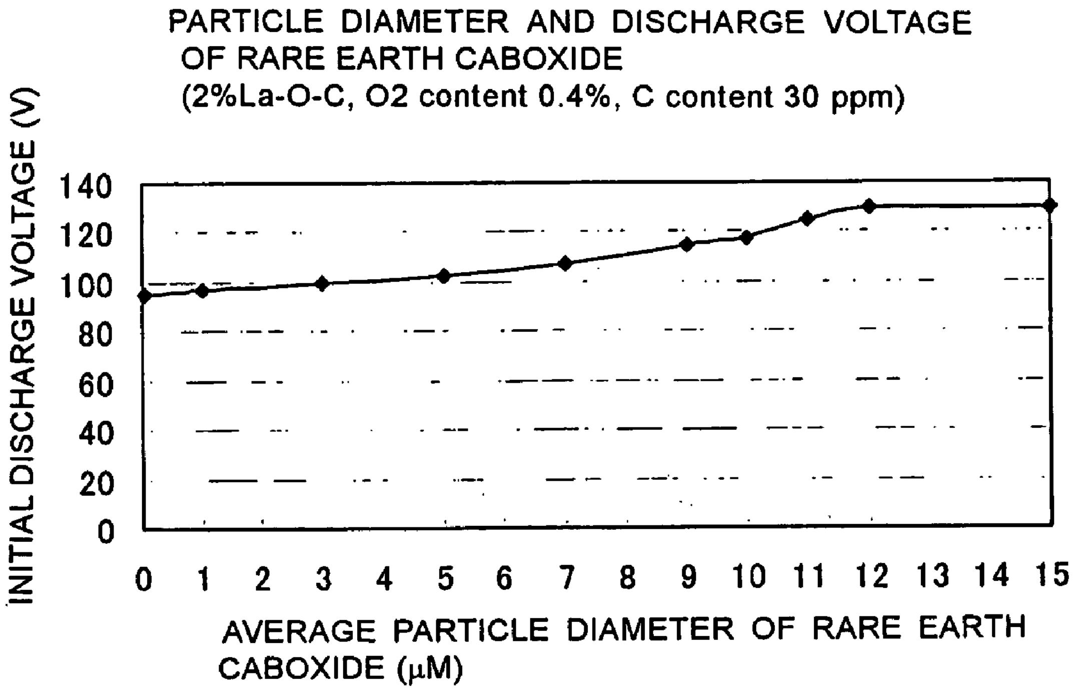
FIG. 14 is a diagram showing the relationship between the average particle diameter (μm) and the initial discharge voltage (V) for a 2% La—C—O compound.

The relationship between the average particle diameter (μm) and the initial discharge voltage (V) for an La—C—O compound in an Mo sinter containing the composition of Example 59 (2% La—O—C compound ($O_2$ content 0.4% by mass, C content 30 ppm)) is as shown in FIG. 14.

Figure 15:
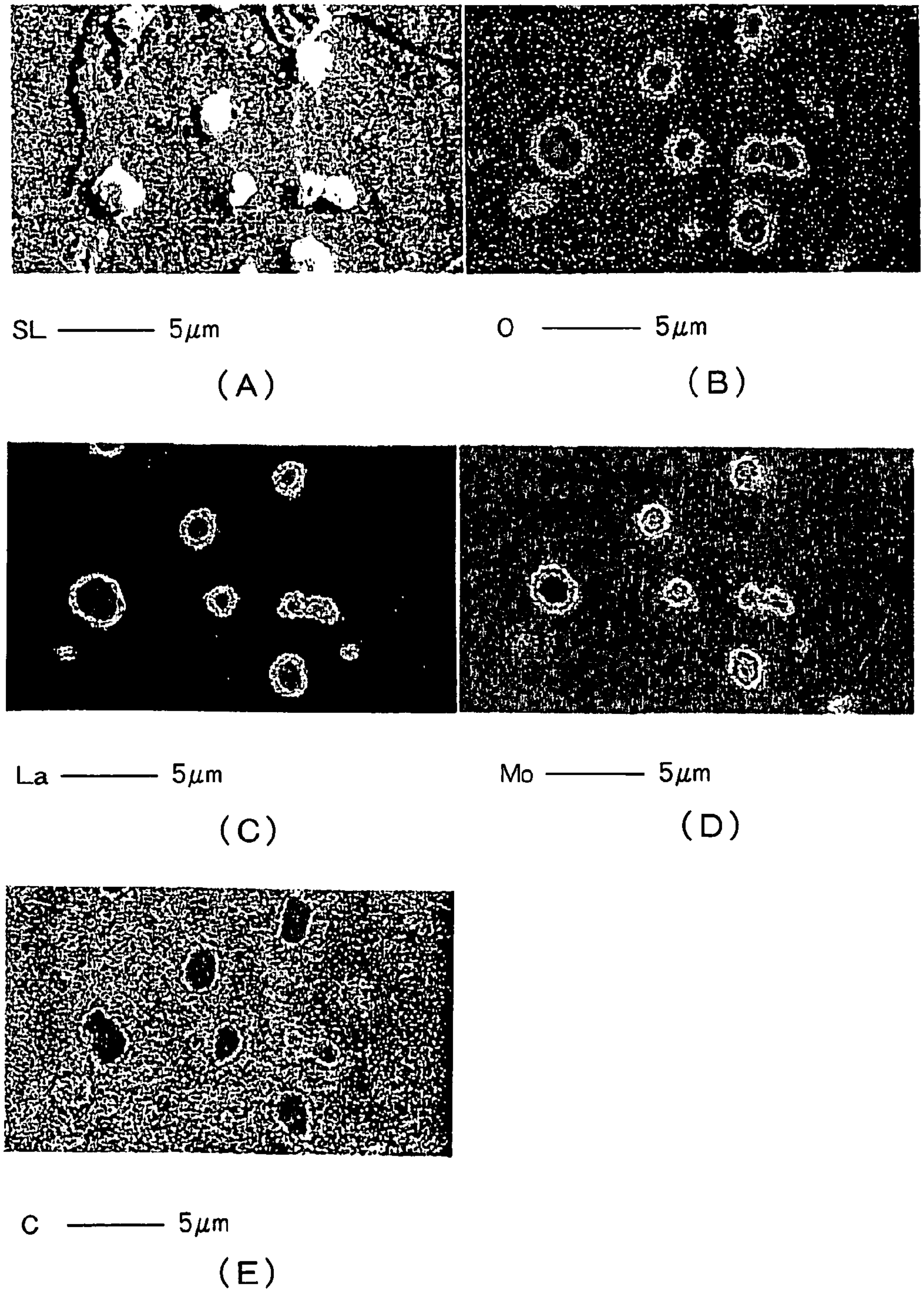
FIG. 15 is a diagram showing analysis by EPMA color mapping for a 2% La—C—O compound.

The results of analysis by color mapping by EPMA for this sinter (that is, 2% La—O—C compound ($O_2$ content 0.4% by mass, C content 30 ppm)) is as shown in FIG. 15. [An area of at least not less than 100 μm×100 μm is measured under conditions for analysis: irradiation voltage=15 kV, irradiation current=$5.0\times10^{-8}$ A, measurement range=visual field of 5000× (when the area of 100 μm×100 μm cannot be measured at one time, measurement can be carried out in a plurality of divided times)].

In FIG. 15, (A) represents a reflection electron image (SEM image), (B) an oxygen (O) color mapped image, (C) a lanthanum (La) color mapped image, (D) a molybdenum (Mo) color mapped image, and (E) a carbon (C) color mapped image. When these data are superimposed, oxygen, lanthanum, molybdenum, and carbon mapping parts overlap, indicating that an La—O—C compound is present.

TABLE 5

La—O—C—Mo system

| Example No. | Compositon | Degreasing conditions, ppm | Carbon content, ppm | Oxygen content, wt. % | Initial voltage, V | Amount of evaporated mercury (after 10,000 hr), mg |
|---|---|---|---|---|---|---|
| Comparative Example 34 | Molybdenum | - (drawing) | — | — | 150 | 0.5 |
| Example 54 | 0.03% La—O—C—Mo | 900° C. × 2 hr | 50 | 0.022 | 150 | 0.4 |

TABLE 5-continued

La—O—C—Mo system

| Example No. | Compositon | Degreasing conditions, ppm | Carbon content, ppm | Oxygen content, wt. % | Initial voltage, V | Amount of evaporated mercury (after 10,000 hr), mg |
|---|---|---|---|---|---|---|
| Example 55 | 0.05% La—O—C—Mo | 900° C. × 2 hr | 50 | 0.021 | 120 | 0.3 |
| Example 56 | 0.1% La—O—C—Mo | 900° C. × 2 hr | 50 | 0.024 | 120 | 0.3 |
| Example 57 | 0.5% La—O—C—Mo | 900° C. × 2 hr | 50 | 0.13 | 120 | 0.3 |
| Example 58 | 1.0% La—O—C—Mo | 900° C. × 2 hr | 50 | 0.21 | 110 | 0.25 |
| Example 59 | 2.0% La—O—C—Mo | 900° C. × 2 hr | 50 | 0.40 | 100 | 0.20 |
| Example 60 | 4.0% La—O—C—Mo | 900° C. × 2 hr | 50 | 0.85 | 90 | 0.15 |
| Example 61 | 7.0% La—O—C—Mo | 900° C. × 2 hr | 50 | 1.5 | 110 | 0.25 |
| Example 62 | 18% La—O—C—Mo | 900° C. × 2 hr | 50 | 4.5 | 120 | 0.3 |
| Example 63 | 25% La—O—C—Mo | 900° C. × 2 hr | 50 | 6.25 | 120 | 0.6 |
| Example 64 | 2.0% La—O—C—Mo | 1000° C. × 8 hr | 0.8 | 0.40 | 150 | 0.4 |
| Example 65 | 2.0% La—O—C—Mo | 900° C. × 2 hr | 50 | 0.40 | 100 | 0.20 |
| Example 66 | 2.0% La—O—C—Mo | 800° C. × 2 hr | 70 | 0.40 | 100 | 0.20 |
| Example 67 | 2.0% La—O—C—Mo | 800° C. × 1 hr | 95 | 0.40 | 100 | 0.20 |
| Example 68 | 2.0% La—O—C—Mo | 500° C. × 1 hr | 110 | 0.40 | 150 | 0.5 |
| Example 69 | 0.1% La—O—C—Mo | 900° C. × 2 hr | 50 | 0.008 | 120 | 0.5 |
| Example 70 | 0.1% La—O—C—Mo | 900° C. × 2 hr | 50 | 0.024 | 120 | 0.3 |
| Example 71 | 7.0% La—O—C—Mo | 900° C. × 2 hr | 50 | 2.8 | 110 | 0.25 |
| Example 72 | 7.0% La—O—C—Mo | 900° C. × 2 hr | 50 | 3.2 | 150 | 0.5 |

TABLE 6

Ce—O—C—Mo system

| Example No. | Compositon | Degreasing conditions, ppm | Carbon content, ppm | Oxygen content, wt. % | Initial voltage, V | Amount of evaporated mercury (after 10,000 hr), mg |
|---|---|---|---|---|---|---|
| Comparative Example 34 | Molybdenum | - (drawing) | — | — | 150 | 0.5 |
| Example 73 | 0.03% Ce—O—C—Mo | 900° C. × 2 hr | 50 | 0.022 | 150 | 0.4 |
| Example 74 | 0.05% Ce—O—C—Mo | 900° C. × 2 hr | 50 | 0.021 | 120 | 0.3 |
| Example 75 | 0.1% Ce—O—C—Mo | 900° C. × 2 hr | 50 | 0.024 | 120 | 0.3 |
| Example 76 | 0.5% Ce—O—C—Mo | 900° C. × 2 hr | 50 | 0.13 | 120 | 0.3 |
| Example 77 | 1.0% Ce—O—C—Mo | 900° C. × 2 hr | 50 | 0.21 | 110 | 0.25 |
| Example 78 | 2.0% Ce—O—C—Mo | 900° C. × 2 hr | 50 | 0.40 | 100 | 0.20 |
| Example 79 | 4.0% Ce—O—C—Mo | 900° C. × 2 hr | 50 | 0.85 | 90 | 0.15 |
| Example 80 | 7.0% Ce—O—C—Mo | 900° C. × 2 hr | 50 | 1.5 | 110 | 0.25 |
| Example 81 | 10.0% Ce—O—C—Mo | 900° C. × 2 hr | 50 | 2.5 | 120 | 0.3 |
| Example 82 | 25% Ce—O—C—Mo | 900° C. × 2 hr | 50 | 6.25 | 120 | 0.6 |
| Example 83 | 2.0% Ce—O—C—Mo | 1000° C. × 8 hr | 0.8 | 0.40 | 150 | 0.4 |
| Example 84 | 2.0% Ce—O—C—Mo | 900° C. × 2 hr | 50 | 0.40 | 100 | 0.20 |
| Example 85 | 2.0% Ce—O—C—Mo | 800° C. × 2 hr | 70 | 0.40 | 100 | 0.20 |
| Example 86 | 2.0% Ce—O—C—Mo | 800° C. × 1 hr | 95 | 0.40 | 100 | 0.20 |
| Example 87 | 2.0% Ce—O—C—Mo | 500° C. × 1 hr | 110 | 0.40 | 150 | 0.5 |
| Example 88 | 0.1% Ce—O—C—Mo | 900° C. × 2 hr | 50 | 0.008 | 120 | 0.5 |
| Example 89 | 0.1% Ce—O—C—Mo | 900° C. × 2 hr | 50 | 0.024 | 120 | 0.3 |
| Example 90 | 7.0% Ce—O—C—Mo | 900° C. × 2 hr | 50 | 2.8 | 110 | 0.25 |
| Example 91 | 7.0% Ce—O—C—Mo | 900° C. × 2 hr | 50 | 3.2 | 150 | 0.5 |

TABLE 7

Sm—O—C—Nb system

| Example No. | Compositon | Degreasing conditions, ppm | Carbon content, ppm | Oxygen content, wt. % | Initial voltage, V | Amount of evaporated mercury (after 10,000 hr), mg |
|---|---|---|---|---|---|---|
| Comparative Example 35 | Niobium | - (drawing) | — | — | 150 | 0.5 |
| Example 92 | 0.03% Sm—O—C—Nb | 900° C. × 2 hr | 50 | 0.022 | 150 | 0.4 |
| Example 93 | 0.05% Sm—O—C—Nb | 900° C. × 2 hr | 50 | 0.021 | 120 | 0.3 |
| Example 94 | 0.1% Sm—O—C—Nb | 900° C. × 2 hr | 50 | 0.024 | 120 | 0.3 |
| Example 95 | 0.5% Sm—O—C—Nb | 900° C. × 2 hr | 50 | 0.13 | 120 | 0.3 |
| Example 96 | 1.0% Sm—O—C—Nb | 900° C. × 2 hr | 50 | 0.21 | 110 | 0.25 |
| Example 97 | 2.0% Sm—O—C—Nb | 900° C. × 2 hr | 50 | 0.40 | 100 | 0.20 |
| Example 98 | 4.0% Sm—O—C—Nb | 900° C. × 2 hr | 50 | 0.85 | 90 | 0.15 |
| Example 99 | 7.0% Sm—O—C—Nb | 900° C. × 2 hr | 50 | 1.5 | 110 | 0.25 |
| Example 100 | 10.0% Sm—O—C—Nb | 900° C. × 2 hr | 50 | 2.5 | 120 | 0.3 |

TABLE 7-continued

| Sm—O—C—Nb system | | | | | | |
|---|---|---|---|---|---|---|
| Example No. | Compositon | Degreasing conditions, ppm | Carbon content, ppm | Oxygen content, wt. % | Initial voltage, V | Amount of evaporated mercury (after 10,000 hr), mg |
| Example 101 | 25% Sm—O—C—Nb | 900° C. × 2 hr | 50 | 6.25 | 120 | 0.6 |
| Example 102 | 2.0% Sm—O—C—Nb | 1000° C. × 8 hr | 0.8 | 0.40 | 150 | 0.4 |
| Example 103 | 2.0% Sm—O—C—Nb | 900° C. × 2 hr | 50 | 0.40 | 100 | 0.20 |
| Example 104 | 2.0% Sm—O—C—Nb | 800° C. × 2 hr | 70 | 0.40 | 100 | 0.20 |
| Example 105 | 2.0% Sm—O—C—Nb | 800° C. × 1 hr | 95 | 0.40 | 100 | 0.20 |
| Example 106 | 2.0% Sm—O—C—Nb | 500° C. × 1 hr | 110 | 0.40 | 150 | 0.5 |
| Example 107 | 0.1% Sm—O—C—Nb | 900° C. × 2 hr | 50 | 0.008 | 120 | 0.5 |
| Example 108 | 0.1% Sm—O—C—Nb | 900° C. × 2 hr | 50 | 0.024 | 120 | 0.3 |
| Example 109 | 7.0% Sm—O—C—Nb | 900° C. × 2 hr | 50 | 2.8 | 110 | 0.25 |
| Example 110 | 7.0% Sm—O—C—Nb | 900° C. × 2 hr | 50 | 3.2 | 150 | 0.5 |

Examples 111 to 143

Sintered electrodes for a cold cathode tube, which comprise an Mo sinter containing the composition of Example 59 (2% La—O—C compound ($O_2$ content 0.4% by mass, C content 50 ppm) and has a corrugated shape as shown in FIG. 11 on the inner wall of the cylindrical side wall part, were prepared to provide a plurality of sintered electrodes for a cold cathode tube as shown in Table 8 (for all the electrodes, the outer diameter distance a is 0.085 mm).

Each electrode was incorporated in a cold cathode tube in the same manner as in Example 59, and the properties thereof were evaluated in the same manner as in Example 59.

The results were as described in Table 8

TABLE 8

| 2% La—O—C sinter ($O_2$ 0.4 wt %, C 50 ppm), a = 0.085 mm | | | |
|---|---|---|---|
| Example No. | b/a | c/b | Discharge voltage, V |
| Example 111 | 0.95 | 1.0 | 110 |
| Example 112 | 0.96 | 0.9 | 110 |
| Example 113 | 0.95 | 0.96 | 110 |
| Example 114 | 0.95 | 0.95 | 105 |
| Example 115 | 0.95 | 0.85 | 104 |
| Example 116 | 0.95 | 0.6 | 95 |
| Example 117 | 0.95 | 0.52 | 82 |
| Example 118 | 0.95 | 0.5 | 80 |
| Example 119 | 0.95 | 0.45 | 75 |
| Example 120 | 0.7 | 1.0 | 113 |
| Example 121 | 0.7 | 0.96 | 113 |
| Example 122 | 0.7 | 0.95 | 108 |
| Example 123 | 0.7 | 0.85 | 107 |
| Example 124 | 0.7 | 0.6 | 98 |
| Example 125 | 0.7 | 0.52 | 85 |
| Example 126 | 0.7 | 0.5 | 83 |
| Example 127 | 0.7 | 0.45 | 76 |
| Example 128 | 0.52 | 1.0 | 135 |
| Example 129 | 0.52 | 0.96 | 135 |
| Example 130 | 0.52 | 0.95 | 130 |
| Example 131 | 0.52 | 0.85 | 129 |
| Example 132 | 0.52 | 0.6 | 120 |
| Example 133 | 0.52 | 0.52 | 107 |
| Example 134 | 0.52 | 0.5 | 105 |
| Example 135 | 0.52 | 0.46 | 95 |
| Example 136 | 0.48 | 1.0 | 155 |
| Example 137 | 0.48 | 0.96 | 155 |
| Example 138 | 0.48 | 0.95 | 150 |
| Example 139 | 0.48 | 0.85 | 149 |
| Example 140 | 0.48 | 0.6 | 140 |
| Example 141 | 0.48 | 0.52 | 127 |
| Example 142 | 0.48 | 0.5 | 125 |
| Example 143 | 0.48 | 0.48 | 75 |

Example 144

For the electrodes of Example 60 and Comparative Example 34, the weld strength was measured. For the weld strength, the electrode was welded to an Mo lead of 0.8 mm in diameter×2.6 mm through a kovar foil of 1.0 mm in diameter×0.1 mm in length, and welding was carried out using a direct current of 500 A×30 ms. For each of the example and the comparative example, 10 assemblies were prepared. These assemblies were subjected to a tensile test at a speed of 10 mm/min (FIG. 10), and the weld strength values were compared. The results are shown in Table 9.

TABLE 9

| n number | Comparative Example 34 | Example 144 (Example 60) |
|---|---|---|
| 1 | 292 | 429 |
| 2 | 312 | 501 |
| 3 | 273 | 532 |
| 4 | 331 | 541 |
| 5 | 370 | 519 |
| 6 | 361 | 485 |
| 7 | 331 | 500 |
| 8 | 351 | 439 |
| 9 | 380 | 551 |
| 10 | 370 | 472 |
| Average | 337 | 497 |

As is apparent from Table 9, the sintered electrode in the example of the present invention has a high strength of joining to the lead wire.

The invention claimed is:

1. A sintered electrode for a cold cathode tube, comprising a cylindrical side wall part, a bottom part provided at one end of the side wall part, and an opening provided at another end of the side wall part, characterized in that the surface roughness (Sm) of the inner surface of the electrode is not more than 100 μm.

2. The sintered electrode for a cold cathode tube according to claim 1, wherein said side wall part has an average thickness of not less than 0.1 mm and not more than 0.7 mm.

3. The sintered electrode for a cold cathode tube according to claim 1 or 2, wherein said bottom part has an average thickness of not less than 0.25 mm and not more than 1.5 mm.

4. The sintered electrode for a cold cathode tube according to claim 1, which is formed of a metal selected from tungsten (W), niobium (Nb), thallium (Ta), titanium (Ti), molybdenum (Mo), and rhenium (Re), or its alloy.

5. The sintered electrode for a cold cathode tube according to claim 1, which has a relative density of not less than 80%.

6. The sintered electrode for a cold cathode tube according to claim 1, which comprises a sinter of a high-melting metal containing a rare earth element (R)-carbon (C)-oxygen (O) compound.

7. The sintered electrode for a cold cathode tube according to claim 6, wherein the content of the rare earth element (R)-carbon (C)-oxygen (O) compound is more than 0.05% by mass and not more than 20% by mass in terms of the rare earth element (R).

8. The sintered electrode for a cold cathode tube according to claim 6 or 7, wherein the content of carbon is more than 1 ppm and not more than 100 ppm.

9. The sintered electrode for a cold cathode tube according to claim 6, wherein the content of oxygen is more than 0.01% by mass and not more than 6% by mass.

10. The sintered electrode for a cold cathode tube according to claim 6, wherein the rare earth element (R)-carbon (C)-oxygen (O) compound is present as particles having an average particle diameter of not more than 10 μm in the sinter.

11. The sintered electrode for a cold cathode tube according to claim 1, wherein, in a section perpendicular to the longitudinal axis direction of the sintered electrode for a cold cathode tube, the inner wall surface of the cylindrical side wall part is in a concave-convex form.

12. The sintered electrode for a cold cathode tube according to claim 1, wherein, in a section perpendicular to the longitudinal axis direction of the sintered electrode for a cold cathode tube, the form of the inner wall surface of the cylindrical side wall part is such that the ratio b/a, wherein a represents the outer diameter distance from an imaginary center ○ calculated from the outer diameter of the sintered electrode for a cold cathode tube and b represents the inner diameter maximum length, is more than 0.50 and not more than 0.95, and the ratio c/b, wherein c represents the inner diameter minimum length and b is as defined above, is more than 0.50 and not more than 0.95.

13. A sintered electrode for a cold cathode tube, comprising a lead wire welded to the bottom part of a sintered electrode for a cold cathode tube according to claim 1, the weld strength per unit sectional area of the lead wire being not less than 400 $N/mm^2$.

14. A cold cathode tube characterized by comprising:

a hollow tubular light transparent bulb into which a discharge medium has been sealed;

a fluorescent material layer provided on the inner wall surface of the tubular light transparent bulb; and a pair of sintered electrodes for a cold cathode tube according to claim 1 provided respectively on both ends of the tubular light transparent bulb.

15. A liquid crystal display device characterized by comprising:.

a cold cathode tube according to claim 14;

a light guide body disposed closely to said cold cathode tube;

a reflector disposed on one surface side of the light guide body; and a liquid crystal display panel disposed on another surface side of the light guide body.

* * * * *